(12) United States Patent
Chisenga et al.

(10) Patent No.: US 10,530,161 B2
(45) Date of Patent: *Jan. 7, 2020

(54) POWER BALANCING IN A MULTI-PHASE SYSTEM

(71) Applicant: SolarCity Corporation, San Mateo, CA (US)

(72) Inventors: Lesley Chisenga, Redwood Shores, CA (US); Aaron Jungreis, San Mateo, CA (US); Paul Garrity, Rockwall, TX (US)

(73) Assignee: Tesla, Inc., Palo Alto, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 14/985,319

(22) Filed: Dec. 30, 2015

(65) Prior Publication Data

US 2016/0248256 A1 Aug. 25, 2016

Related U.S. Application Data

(63) Continuation of application No. 13/802,438, filed on Mar. 13, 2013, now Pat. No. 9,257,837.
(Continued)

(51) Int. Cl.
*H02J 3/00* (2006.01)
*H02J 3/38* (2006.01)
(Continued)

(52) U.S. Cl.
CPC ............ *H02J 3/383* (2013.01); *H02J 1/10* (2013.01); *H02J 3/26* (2013.01); *H02M 7/44* (2013.01);
(Continued)

(58) Field of Classification Search
USPC .......................................................... 307/82
See application file for complete search history.

(56) References Cited

U.S. PATENT DOCUMENTS 7,576,449 B2 8/2009 Becker et al.
8,369,113 B2 2/2013 Rodriguez
(Continued)

FOREIGN PATENT DOCUMENTS

CN 1997900 A 7/2007
CN 101710704 A 5/2010
(Continued)

OTHER PUBLICATIONS

International Search Report, dated Sep. 8, 2014, for related international patent application PCT/GB2014/050004, 5 pages.
(Continued)

*Primary Examiner* — Rexford N Barnie
*Assistant Examiner* — Dru Parries
(74) *Attorney, Agent, or Firm* — Kilpatrick Townsend and Stockton LLP

(57) ABSTRACT

Some embodiments of the invention provide a method for balancing the power output to each phase of a set of micro-inverters. The method of some embodiments is performed by a gateway, which receives output messages from a plurality of micro-inverters. The gateway identifies the phase of each micro-inverter and calculates the output of the plurality of micro-inverters to each power line of a multi-phase system. The gateway then sends control signals to the micro-inverters to control the output of each micro-inverter to maintain a balanced aggregate power output to each phase of the power grid.

14 Claims, 20 Drawing Sheets

Related U.S. Application Data

(60) Provisional application No. 61/749,252, filed on Jan. 4, 2013.

(51) Int. Cl.
*H02J 1/10* (2006.01)
*H02J 3/26* (2006.01)
*H02M 7/44* (2006.01)

(52) U.S. Cl.
CPC ............... *Y02B 10/14* (2013.01); *Y02E 40/50* (2013.01); *Y02P 80/23* (2015.11); *Y10T 307/707* (2015.04)

(56) References Cited

U.S. PATENT DOCUMENTS

| | | | |
|---|---|---|---|
| 9,018,801 | B2 | 4/2015 | Bremicker et al. |
| 9,270,117 | B2 | 2/2016 | Umland |
| 9,520,721 | B2 | 12/2016 | Luo |
| 2008/0294472 | A1 | 11/2008 | Yamada |
| 2011/0007527 | A1 | 1/2011 | Liu et al. |
| 2011/0205766 | A1 | 8/2011 | Rodriguez |
| 2011/0246338 | A1* | 10/2011 | Eich ............ G06F 17/50 705/28 |
| 2011/0298292 | A1 | 12/2011 | Bremicker et al. |
| 2012/0049637 | A1 | 3/2012 | Teichmann et al. |
| 2012/0057388 | A1 | 3/2012 | Garrity |
| 2012/0063177 | A1 | 3/2012 | Garrity |
| 2012/0065803 | A1 | 3/2012 | Teichmann et al. |
| 2012/0098346 | A1* | 4/2012 | Garrity ............ H02J 3/383 307/82 |
| 2013/0235637 | A1 | 9/2013 | Rodriguez |

FOREIGN PATENT DOCUMENTS

| | | |
|---|---|---|
| CN | 102122897 A | 7/2011 |
| CN | 102449871 A | 5/2012 |
| CN | 102714414 A | 10/2012 |
| DE | 202010006020 U1 | 10/2011 |
| EP | 2219276 A1 | 8/2010 |
| EP | 2348597 A1 | 7/2011 |
| GB | 2415841 A | 4/2006 |
| WO | 2014/106744 A2 | 7/2004 |
| WO | 2006/048688 A1 | 5/2006 |
| WO | 2010/027421 A2 | 3/2010 |

OTHER PUBLICATIONS

Written Opinion, dated Sep. 8, 2014, for related international patent application PCT/GB2014/050004, 7 pages.
International Preliminary Report on Patentability, dated Jul. 7, 2015, for related international patent application PCT/GB2014/050004, 8 pages.
International Search Report and Written Opinion, dated Feb. 14, 2006, for international patent application PCT/GB2005/050197, 13 pages.
International Preliminary Report on Patentability, dated May 8, 2007, for international patent application PCT/GB2005/050197, 10 pages.
Rodriguez, Cuauhtemoc, et al., "Dynamic Stability of Grid-Connected Photovoltaic Systems," Power Engineering Society General Meeting, Jun. 6-10, 2004, 7 pages, IEEE, Pistacaway, New Jersey, USA.
Office Action, dated May 24, 2017, for related Chinese application CN201480012429.0, including English translation, 27 pages.
Office Action, dated Sep. 13, 2017, for related European application 14705383.9, 4 pages.
Search Report, dated Jan. 3, 2018, for related Chinese application CN201480012429.0, 4 pages.

* cited by examiner

POWER BALANCING IN A MULTI-PHASE SYSTEM

CLAIM OF BENEFIT TO PRIOR APPLICATIONS

This Application is a continuation application of U.S. patent application Ser. No. 13/802,438, filed Mar. 13, 2013, now published as U.S. Publication 2014/0191583. U.S. patent application Ser. No. 13/802,438 claims the benefit of U.S. Provisional Patent Application 61/749,252 filed Jan. 4, 2013. U.S. patent application Ser. No. 13/802,438, now published as U.S. Publication 2014/0191583 and U.S. Provisional Patent Application 61/749,252 are incorporated herein by reference.

BACKGROUND

The power grid is a distribution network for delivering power from suppliers to consumers. Traditionally, the electrical needs of consumers have been met by power companies distributing power through the grid. A power grid provides the majority of the power that is made available to a region. Power is generated at a location and distributed through the power grid to the surrounding areas. This power is distributed in the form of alternating current (AC) power, which is transmitted at very high voltages along power lines. The majority of the power transmitted through the grid is in three phases.

Power is transmitted in three phases to provide an even source of power which can be readily distributed over long distances with efficient wiring costs. Three-phase power is AC power that is transmitted along three separate power lines. Each line of power is in a different phase, with the phase of each power line shifted relative to the other two power lines by 120 degrees. These phases are shifted from each other to provide the consistency of a DC power source using AC power.

Three-phase power is a standard method for power distribution throughout the world. In the United States, power is distributed in three phases, but the majority of all homes are run on a single phase. The three-phase power is split into single phases at a transformer, where the voltages are stepped down and the phases are split up. However, some homes and businesses are configured to receive three-phase power.

FIG. 1 illustrates energy usage in a home 105 wired for three-phase power from the power grid. The home 105 may be any site where power is consumed or produced, such as an industrial building or an isolated solar panel installation. FIG. 1 shows three power lines 125, 130, and 135, the home 105, a load 160, and a power grid 120. The three power lines 125, 130, and 135 provide power from the grid 120 to the load 160 in the home 105 in three different phases shown in graphs 145, 150, and 155 respectively.

The load 160 for the home 105 is powered by the three power lines 125, 130, and 135 supplied by the power grid 120. The graphs 145, 150, and 155 of the three phases show that the phases of the power lines 125, 130, and 135 are shifted in time with a phase difference of one-third of a cycle or 120 degrees. The phase difference provides power such that one of the three phases will be reaching its peak at three different points of a single cycle of a particular power line, which allows an AC power source to provide the consistency of a DC power source. Some alternative power generators, such as solar panels, provide DC power, but in order to be used with the grid, the DC power source must be converted to AC power.

Solar panels have become an increasingly common alternative source of energy. With installations of varying sizes, consumers have also become producers, resulting in a multitude of power producers, rather than a single producer. Consumers are able to produce their own power, reducing their reliance on the power companies. Due to the nature of solar power energy being more readily available during the day, residential customers may be producers during the day, but consumers during the night as the needs of a particular site change throughout the day. As the amount of power that the solar installation inject into the grid and the needs of the consumer change throughout the day, additional power may need to either be drawn from the grid or returned to the grid. However, in order for the solar installation to inject power into the grid, the DC power generated by the solar panels on the installation needs to be converted to AC power in a form similar to the power provided by the grid.

The conversion of power from solar panels from DC power to AC power is often done using inverters. Typically, the solar panels are wired in series and then connected with high-voltage cables to connect the DC power to an inverter. These solar panel installations use a single, large inverter to convert the generated power into power which can be used in the home or fed back into the grid.

FIG. 2 illustrates energy usage in a home 205 wired for three-phase power where power supplied for the home 205 is supplied from solar panels 215 which provide DC power to a single inverter 262. Similarly to FIG. 1, the three power lines 225, 230, and 235 provide power to the load 260 of the home 205. In addition, FIG. 2 shows solar panels 215 and inverter 262. The solar panels 215 provide DC power to the inverter 262 which converts the DC power and provides AC power to the three power lines 225, 230, and 235. Single inverter installations require a large inverter as well as heavy, high-voltage cabling to bring the DC power to the AC inverter.

In recent years there has been an emergence of interest in module-integrated electronics. The solar micro-inverter in particular has been noted as a product that has a number of benefits over the existing conventional solutions. Micro-inverters are smaller inverters which are installed on or near the solar panels themselves. Rather than a single inverter for inverting all of the power provided by an installation, micro-inverters invert the power of one or a few solar panels and provide AC power at the source panels. Micro-inverters provide many benefits over traditional inverters. These benefits include: improved energy harvest over the lifetime of the installation, particularly in scenarios of shading or other causes of mismatch in solar photovoltaic (PV) installations and low voltage DC (less than 80V from a single panel), which is safer and significantly reduces arcing faults. Additional benefits of an energy harvesting system based on micro-inverters also include the ability to pin point failures or problems with solar panels (or solar modules), and the ease of scalability when adding panels to an installation. The installation process itself is also extremely easy and can be considered as a plug and play method.

BRIEF SUMMARY

Some embodiments of the invention provide a method for maintaining balanced energy transmissions between the power lines of a multi-phase system. In order to maintain balanced energy transmissions, the method of some embodiments identifies the phase of the power line to which each micro-inverter is connected. The method of some embodiments calculates an aggregate power output for each power line of the multi-phase system and controls the individual power output of each micro-inverter. In some embodiments, rather than maintaining balanced energy transmissions, the invention may be used to balance other aspects of the power lines of the multi-phase system. For example, some embodiments of the invention provide a method for maintaining balanced voltage levels between the power lines of a multi-phase system as discussed below. In some embodiments, the method is performed by a gateway which communicates with each of the micro-inverters.

In some embodiments, the method receives identification messages from each of the micro-inverters based on the phase of the power line to which the micro-inverter is connected and calculates an offset based on the identification message to determine which power line the micro-inverter is connected to. The method calculates an aggregate power output for each power line of the multi-phase system. In some embodiments, the method receives power output messages from each of the individual micro-inverters and uses the individual power output messages to determine an aggregate power output for each power line of the multi-phase system. The method controls the power output of the individual micro-inverters in order to adjust the aggregate power being output to each power line. In some embodiments, the method sends control signals which cause a micro-inverter to shut down or to scale back its power production in order to control the aggregate power output.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a system for providing a balanced output to a multi-phase power grid. The system comprises a gateway for monitoring and managing the output of a plurality of micro-inverters, a plurality of micro-inverters for providing power output to each power line of the multi-phase system, and a communication system for transmitting and receiving messages between the gateway and the micro-inverters. The communication system, in some embodiments, is a wireless system with a wireless transmitter and receiver located at the gateway and at each micro-inverter. In other embodiments, the communication system may be a wired or some other alternative communication system.

Figure 3:
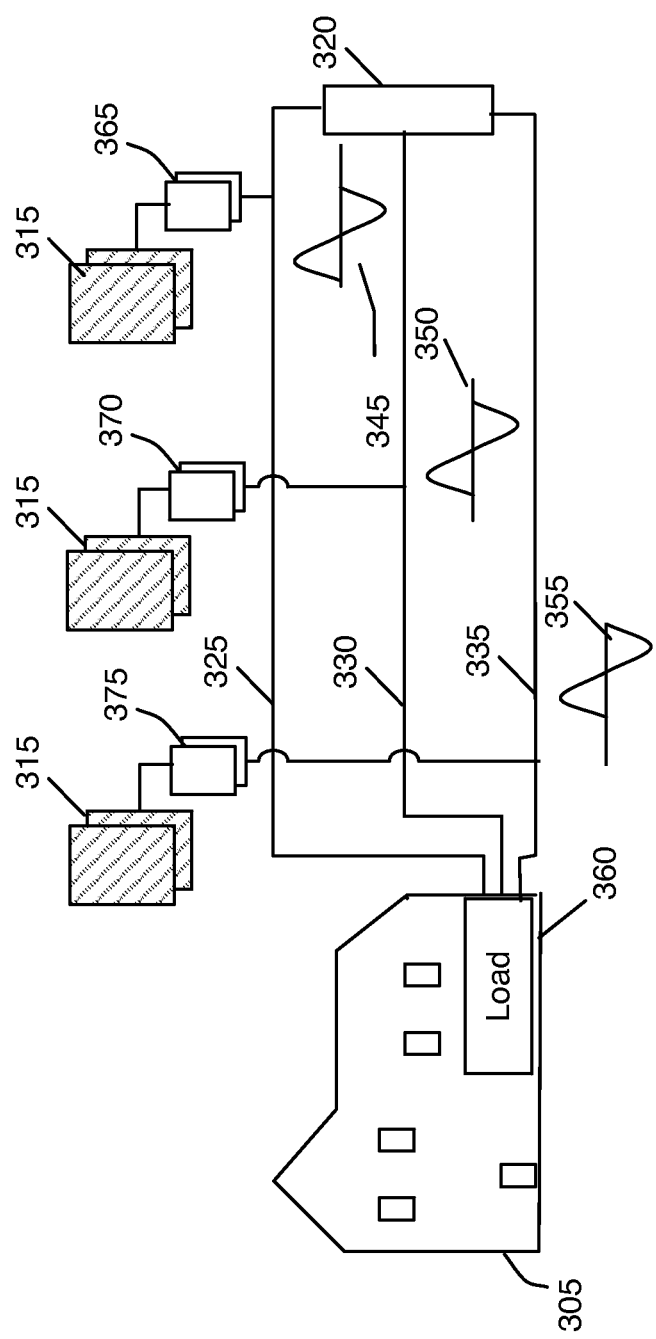
FIG. 3 illustrates energy usage in a home wired for three-phase power with micro-inverters.

FIG. 3 illustrates a three-phase power system 300 for supplying three-phase power to a home 305. The power of the three-phase power system 300 is supplied by the power company as well as by a set of solar panels. FIG. 3 illustrates a power grid 320 for supplying power to the home 305. Three power lines 325, 330, and 335 provide power from the grid 320 to the load 360 in the home 305 in three different phases. The voltage levels of the power lines 325, 330, and 335 are illustrated in graphs 345, 350, and 355 respectively. The micro-inverters 365, 370, and 375 convert DC power harvested by solar panels 315 into AC power and inject the converted AC power into the three power lines 325, 330, and 335, respectively.

Although the micro-inverters 365, 370, and 375 are illustrated as being connected to a single line, it should be apparent to one skilled in the art that the micro-inverters are additionally connected to either a reference neutral (a fourth line), or to one of the other active lines. The reference neutral is used as a return line for the power. In other cases, the micro-inverters may inject power into one line but also be connected to a second line. For instance, micro-inverters 375 could have a first connection to line 335 as drawn and have a second additional connection to line 330 as a return line. Similarly, micro-inverters 370 could have a first connection to line 330 as drawn and have a second additional connection to line 325 as a return line. Similarly, micro-inverters 365 could have a first connection to line 325 as drawn and have a second additional connection to line 335 as a return line.

The power lines 325, 330, and 335 power the grid 320 as well as the load 360. Since each of the three power lines carries power in a different phase of the three-phase power system, a power line that is used to carry power of a particular phase is sometimes identified by that particular phase in this invention. For example, a micro-inverter that provides power to a power line of "phase 1" of a three-phase system is sometimes referred to as the micro-inverter of "phase 1", and the power line that carries the power for "phase 1" of the three-phase system is sometimes referred to as the "phase 1" power line. A micro-inverter that injects power into a power line of a particular phase is sometimes referred to as a micro-inverter "of the particular phase" or a micro-inverter "associated with the particular phase".

Figure 1:
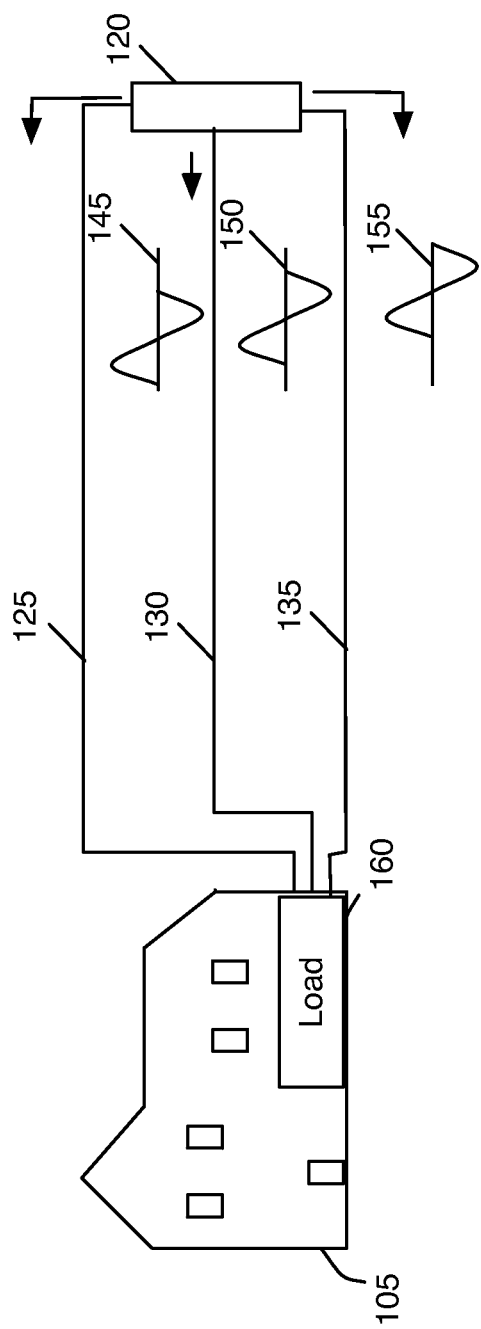
FIG. 1 illustrates energy usage in a home wired for three-phase power from the grid.
Figure 2:
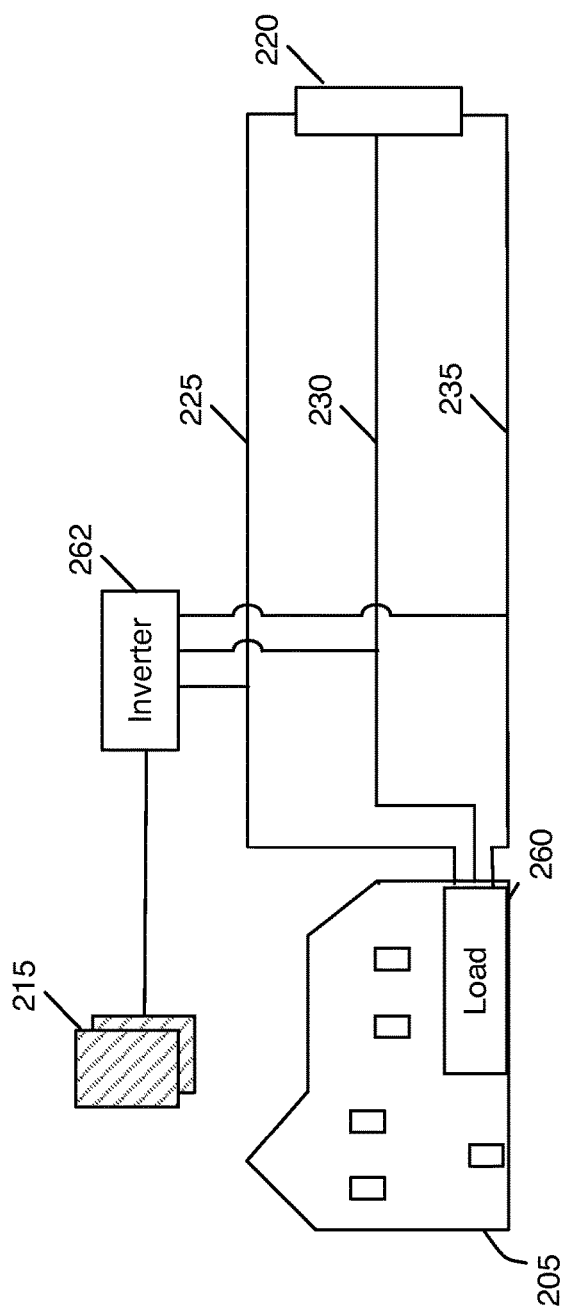
FIG. 2 illustrates energy usage in a home wired for three-phase power with a single inverter.

Unlike the large inverter of FIG. 2 that is used to convert the power of an entire installation of solar panels, micro-inverters are smaller inverters that are used to convert the power produced by one or a few solar panels. In the example of FIG. 3, each micro-inverter in micro-inverter sets 365, 370, and 375 connects one or a few solar panels. Although the sets of micro-inverters are shown as separated into groups according to the power lines to which they are connected, one skilled in the art will recognize that the physical layout of the micro-inverters in an installation may vary. For instance, in some embodiments, the micro-inverters attached to each power line of the power grid may be physically interspersed with the micro-inverters attached to the other power lines.

In order for micro-inverters 365, 370, and 375 to inject generated power into the grid 320 (i.e., through power lines 325, 330, and 335), the voltage level being produced by the micro-inverters must match the voltage level on the grid 320. Since the power on the grid 320 is AC power, the voltage level on the grid is sinusoidal and cyclically goes through different phases (i.e., 0° to 360°). Hence in order to match the voltage level of the micro-inverters with the voltage level of the grid, the phase of the power being generated by the micro-inverters must match the phase of the grid 320. Since the grid 320 is a three-phase system with three different power lines 325, 330, and 335 that are on three different phases, a micro-inverter injecting power into a particular power line must ensure that the phase of the power it provides matches that phase of the power on the power line. In the example of FIG. 3, the micro-inverter 375 aligns the phase of the power it injects into the power line 335 to match the phase of power that is on the power line 335, the micro-inverter 370 aligns the phase of the power it injects into the power line 330 to match the phase of power that is on the power line 330, and the micro-inverter 365 aligns the phase of the power it injects into the power line 325 to match the phase of power that is on the power line 325.

In some embodiments, a micro-inverter aligns its power output with the power on the grid by sensing the voltage on the power line. Each micro-inverter will produce power that is aligned with the phase and amplitude of the voltage sensed on the power line of the power grid to which the micro-inverter is connected. Descriptions of micro-inverters can be found in U.S. Patent Application Publication No. 2012/0057388 and U.S. Patent Application Publication No. 2012/0063177.

As long as the different sets of micro-inverters 365, 370, and 375 inject similar amount of power into each of the three power lines, the three phases of the three-phase power system will remain balanced or symmetrical. However, the power output injected by micro-inverters to different power lines of the three-phase system is based on the production of individual micro-inverters. The power production of the micro-inverters is in turn based on the power production of the solar panels. The production of the solar panels can vary throughout the day based on weather, the angle of the sun, etc. The production of the solar panels may also vary greatly from solar panel to solar panel depending on factors such as shading on a solar panel, solar panel position, solar panel performance, solar panel failure, etc. Since each phase (i.e., power line) in the three-phase system 300 receives power from its own set of micro-inverters, and those micro-inverters in turn receives power from its own set of solar panels, variations in power production from the different solar panels may cause power being injected into the different power lines to differ from each other significantly, causing an imbalanced or asymmetrical output to the multi-phase system. In other words, when each power line in a three-phase power system is powered by an independent power source (e.g., an independent set of micro-inverters and solar panels), imbalance or asymmetry may arise in the three-phase system when some of the solar panels/micro-inverters fail to produce as much power as other solar panels/micro-inverters.

Figure 4:
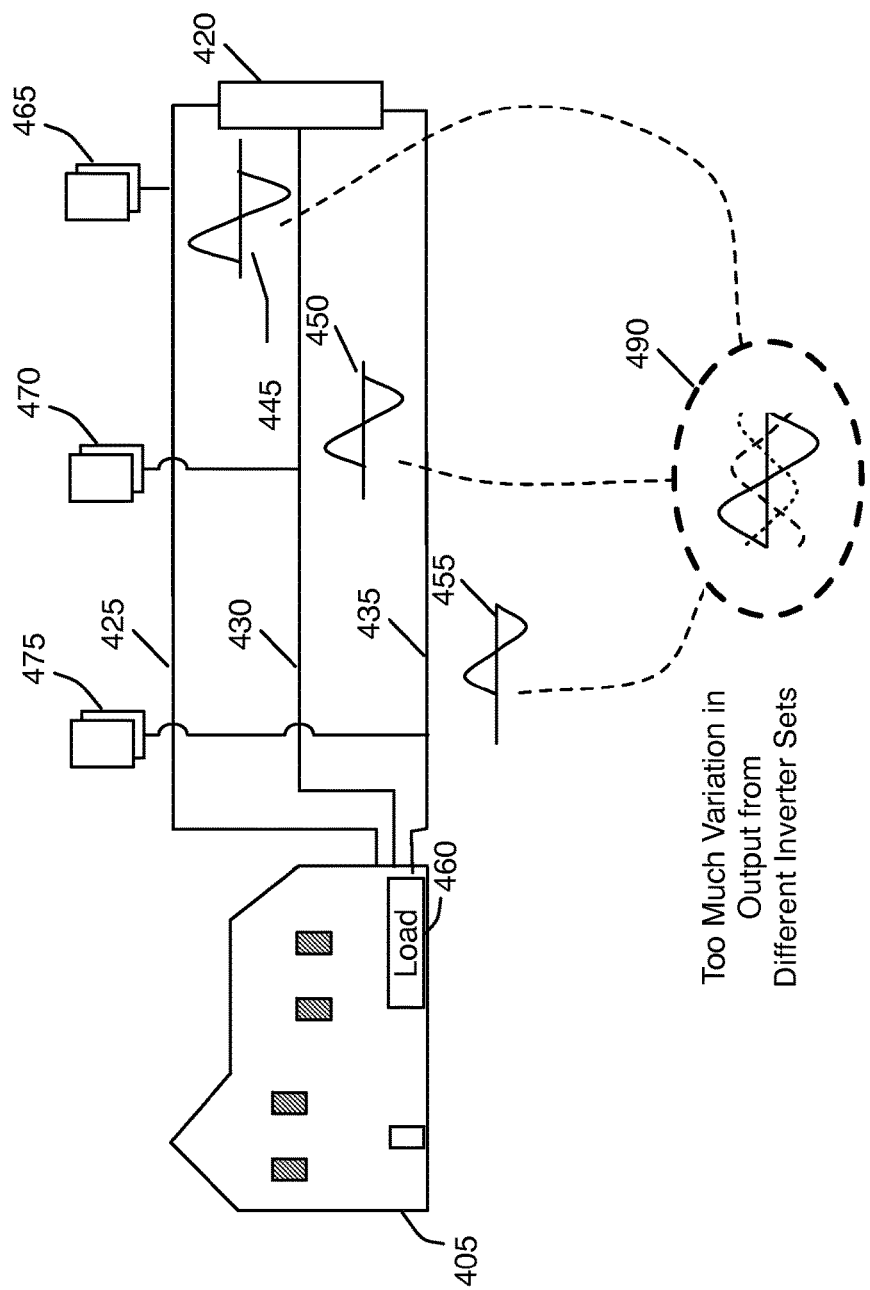
FIG. 4 illustrates asymmetric power generation in a home wired for three-phase power.

FIG. 4 illustrates asymmetric power generation in a three-phase power system 400. FIG. 4 shows three power lines 425, 430, and 435 for delivering three-phase power to a home 405 from a grid 420. The micro-inverter set 475 injects power to the power line 435, the micro-inverter set 470 injects power to the power line 430. The micro-inverter set 465 injects power to the power line 425. The amount of power injected to the power lines 425, 430, and 435 are illustrated in graphs 445, 450, and 455 respectively. The graphs 445, 450, and 455 show that the power production from the three sets of micro-inverters are different (the power production of the micro-inverter set 475 is less than the power production from micro-inverter set 470, and the power production of the micro-inverter set 470 is less than the power production from the micro-inverter set 465). Thus, the solar power being injected into individual phases of the three-phase system is out of balance (as illustrated in the composite graph 490).

The imbalances in the power being fed to each power line can cause problems for power distribution. When the total power output is relatively low, the level of imbalance in the power output to each power line may be acceptable. In fact, many residential installations are low-power single-phase installations which inject all of their generated power into a single power line of the power grid. However, when the amount of power being generated by the solar panels at a particular site is significant, imbalance between different power lines of a three-phase power system may cause voltage spikes, which may disconnect a micro-inverter or cause appliances to shut down.

Figure 5:
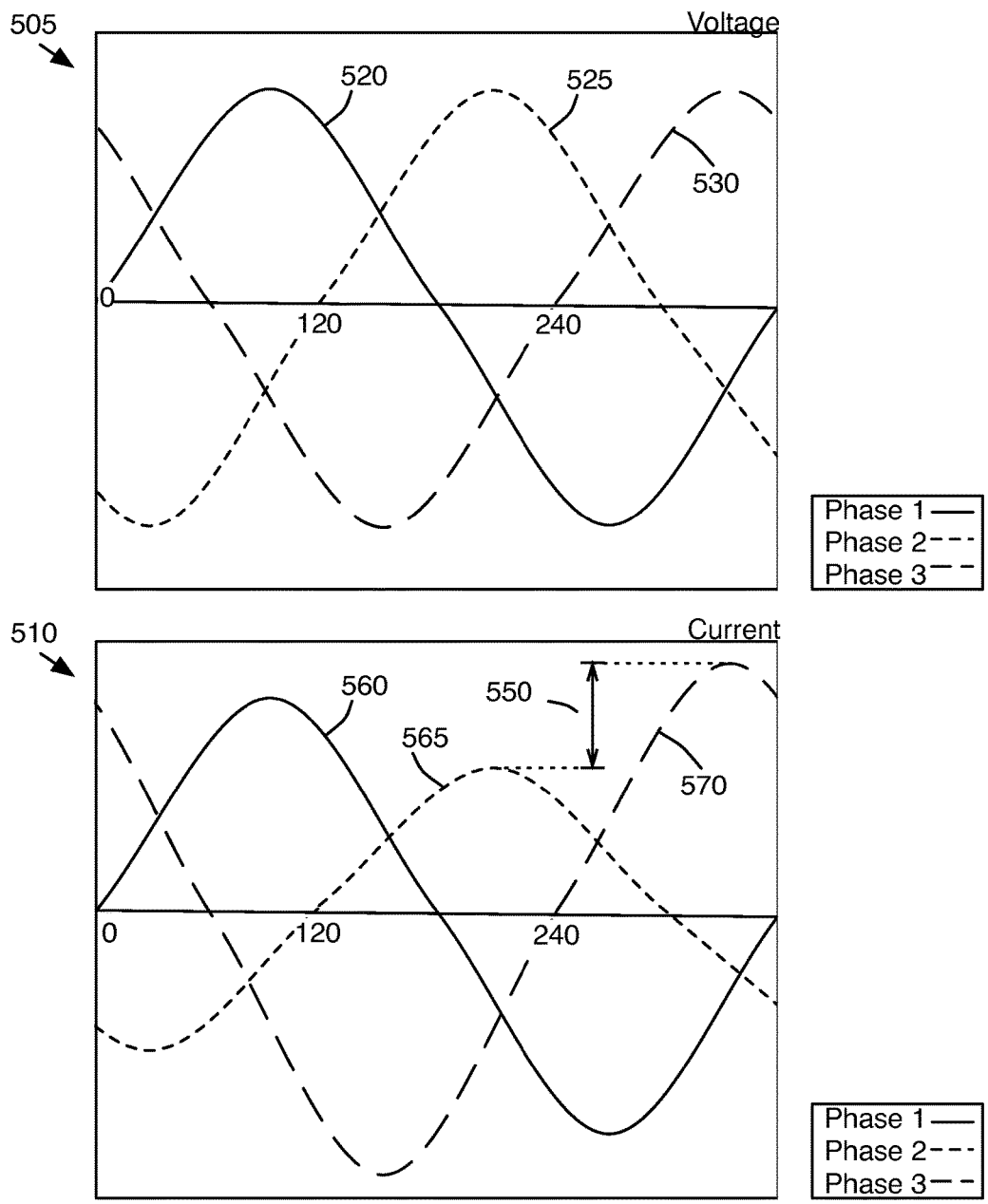
FIG. 5 illustrates the power of a three-phase system and the imbalance that may arise when the power being returned to the grid is provided by independent power sources.

FIG. 5 illustrates the power levels of a three-phase system and the imbalance that may arise when the power being injected to the grid is provided by power sources that are independent of each other. The imbalance may arise when the independent power sources provide different amounts of power to the different power lines/phases. FIG. 5 includes a first graph 505 for illustrating the voltage levels of the three-phase system and a second graph 510 for illustrating the current levels of the three-phase system.

The first graph 505 includes voltage level 520 for phase 1 power line of the three-phase system, voltage level 525 for phase 2 power line of the three-phase system, and voltage level 530 for phase 3 power line of the three-phase system. When micro-inverters are used to produce power for each power line of the three-phase system, each micro-inverter matches both the amplitude and phase of the voltage levels at the power grid. Therefore, even when the power generated by a particular solar panel changes, it will not affect the output voltage of the micro-inverter. However, because the power produced is a product of the voltage and the current, when the voltage is held constant, changes in the power production of the solar panels will be reflected in the current produced by the micro-inverter. The second graph 510 includes current level 560 for the phase 1 power line, current level 565 for the phase 2 power line, and current level 570 for the phase 3 power line.

In this example, though the peak voltage levels of the three power lines are the same (as seen in the voltage graph 505), the peak current levels generated for the three power line are different (as seen in the current graph 510), which will result in differing power outputs for each power line. As illustrated in the current graph 510, the peak output of the current level 565 of phase 2 and the current level 570 of phase 3 differ by a peak current difference 550. This difference in peak current levels reflects the differences in power output between the three phases. The differences in peak current levels may result from decreased production by the solar panels attached to the micro-inverters connected to a particular phase. Factors such as shading and solar panel performance may affect the current production of a particular solar panel.

Figure 6:
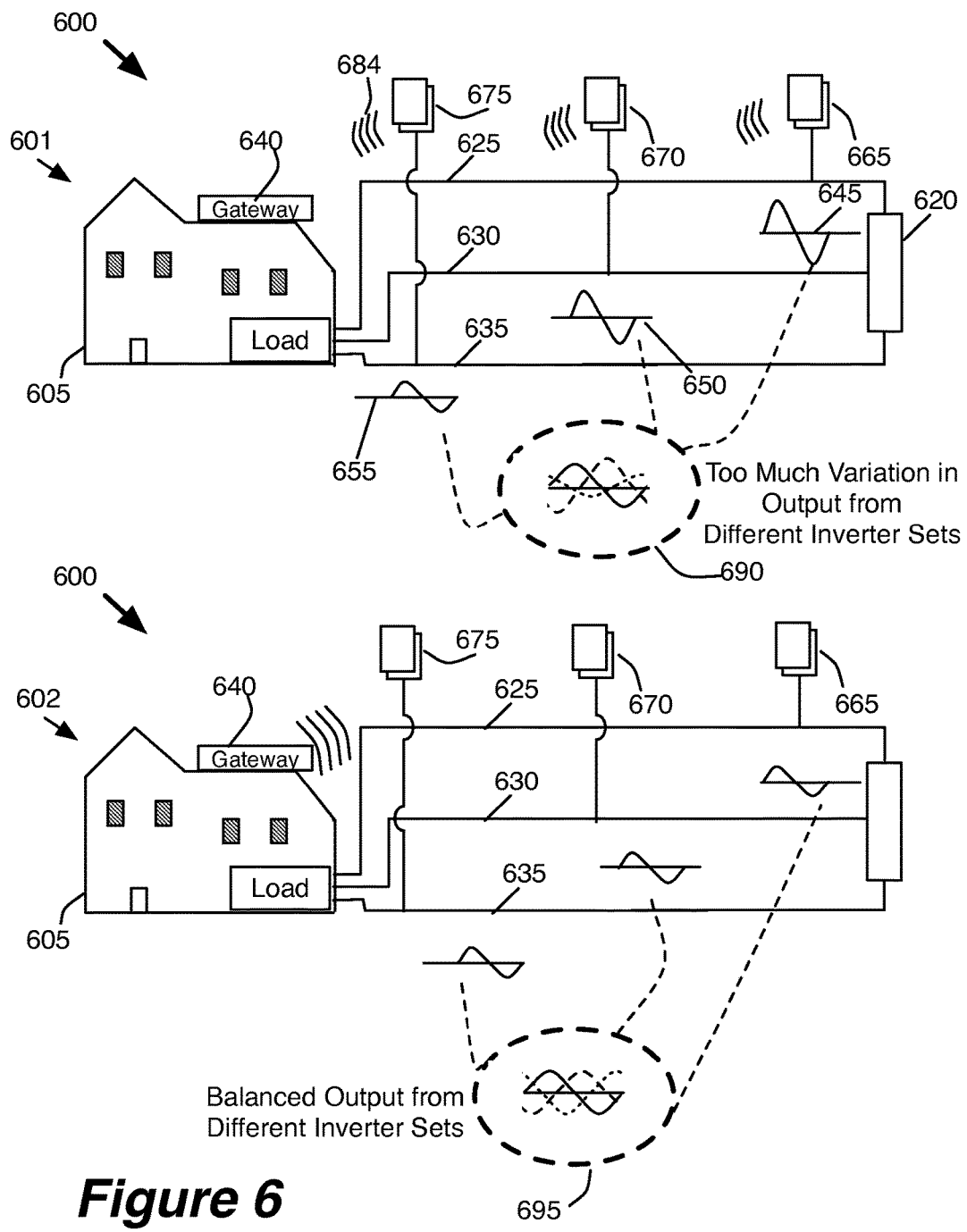
FIG. 6 illustrates the output balancing system of some embodiments.

Some embodiments of the invention provide a communication system by which the imbalance between the three power lines is detected and reported to a gateway. The gateway in turn controls the micro-inverters to make adjustments in order to maintain balanced or symmetrical power output between the power lines. For some embodiments, FIG. 6 illustrates a system 600 that includes a gateway for balancing the power outputs from micro-inverters to a three-phase system. The output balancing system 600 allows for the management of multiple power sources to create a balanced aggregate output to each power line. FIG. 6 illustrates three power lines 625, 630, and 635, a home 605, sets of micro-inverters 665, 670, and 675, and a grid 620. The sets of micro-inverters 665, 670, and 675 output power along the power lines 625, 630, and 635 respectively. The three power lines 625, 630, and 635 provide power from the grid 620 to the load 660 in the home 605 in three different phases. In addition, FIG. 6 shows a wireless communication system 684 by which the gateway 640 communicates with the micro-inverters 665, 670, and 675.

The communication system 684 communicatively couples the micro-inverters 665, 670, and 675 with the gateway 640 and allows information to be exchanged between devices in the communication system. In some embodiments, the communication system is a wireless communication system. The communication system can be implemented in any one of a number of wireless communication systems such as ZigBee, Wifi, Bluetooth, Wireless MBus, etc. Though not illustrated, instead of or in addition to wireless systems, some embodiments use power line communication, in which a data signal is modulated over a lower frequency carrier signal that is typical of mains voltage.

The gateway 640, in some embodiments, is used to monitor and manage the micro-inverters of an installation. In some embodiments, the gateway 640 communicates with the micro-inverters 665, 670, and 675 over the communication system 684. The gateway monitors and controls the output of each of the individual micro-inverters that feed into each power line of the multi-phase system. In some embodiments, the gateway may be located at a site remote from the micro-inverters. The operations of the gateway for some embodiments will further described below in Sections I-III.

FIG. 6 illustrates a power output balancing operation in two stages 601 and 602. The first stage 601 shows the power levels of the three power lines 625, 630, and 635 in graphs 645, 650, and 655 respectively and in a composite graph 690. The composite graph 690 superimposes the graphs 645, 650, and 655 and shows that the phase of the power in each of the power lines is shifted from the others by 120 degrees (one third of a full cycle). As can be seen in the composite graph 690, the peak amplitudes on the different power lines are different, and hence the power being injected into the three-phase system is asymmetric and out of balance. Specifically, the output of the set of micro-inverters 675 to the power line 635 is less than the output of the set of micro-inverters 670 to the power line 630, and the output of the set of micro-inverters 670 to the power line 630 is less than the output of the set of micro-inverters 665.

The first stage 601 also illustrates messages being communicated between the sets of micro-inverters 665, 670, and 675 and the gateway 640 over the communication system 684. The messages may be used to identify the power line to which each micro-inverter is connected. The messages may also provide updates to the gateway 640 regarding the power being output by each micro-inverter in the sets of micro-inverters 665-675 (e.g., total power output, voltage levels, current levels, etc.).

In the second stage 602, the gateway 640 has received the messages and calculated the aggregate power being output to each power line of the power grid 620 by the sets of micro-inverters 665, 670, and 675. Based on the calculations, the gateway determines whether the imbalance in the output of a set of micro-inverters is acceptable with regard to a threshold amount (e.g., whether the difference in total power injected by the different sets of micro-inverters to different power lines of the three-phase system is greater than the threshold amount). The threshold amount may be based on government regulations. When, as in this example, the gateway determines that the imbalance in the power output to the power lines 625, 630, and 635 are outside of the threshold amount, the gateway 640 sends control signals 685 to the individual micro-inverters in 665, 670, and 675 to control the power being produced by the individual micro-inverters. By changing the power output of some of the micro-inverters, the power being injected into the three different power lines will be balanced, as illustrated in the composite graph 695, which super imposes the power levels of the three different power lines after the adjustments has been made to the individual micro-inverters.

Figure 7:
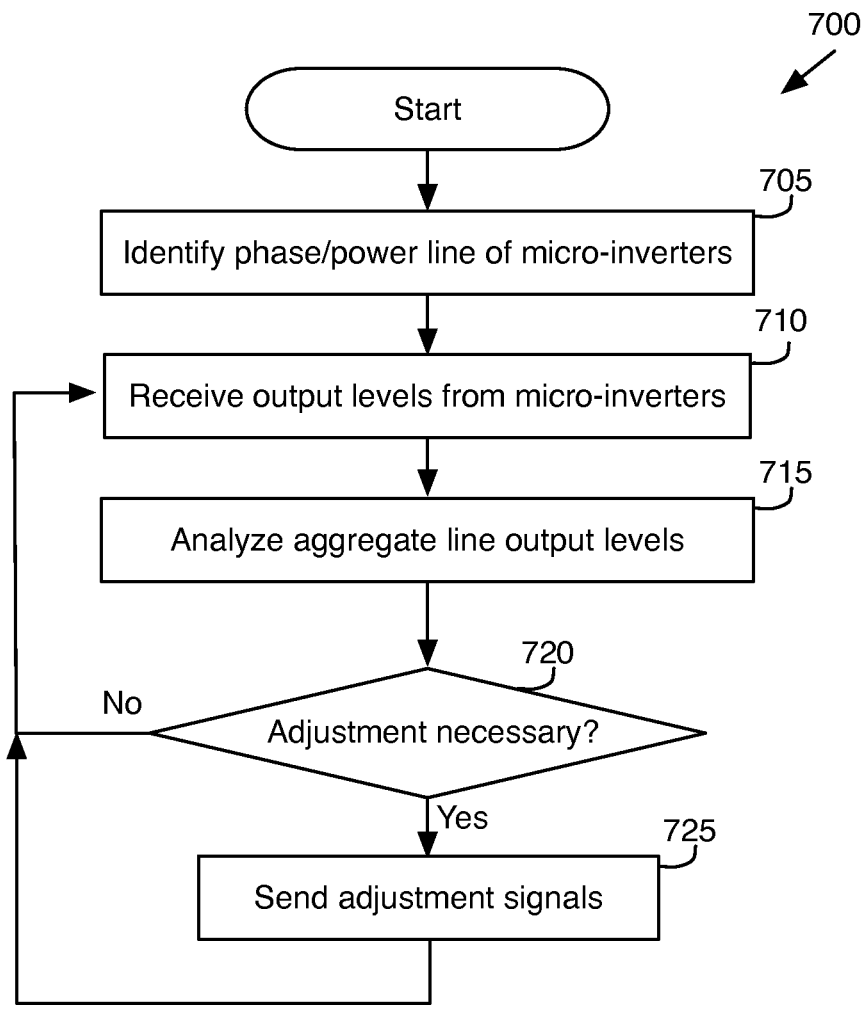
FIG. 7 conceptually illustrates the process performed to provide balanced power to each power line of a multi-phase system.

FIG. 7 conceptually illustrates a process 700 for balancing power between the different power lines of a multi-phase system. In some embodiments, the process 700 is performed by a gateway that is configured to interact with sets of micro-inverters. The process 700 identifies (at 705) the power line to which each micro-inverter is connected based on the phase of the power line. Since the phases of the voltage and/or current of the different power lines are different, the gateway can determine which power line a micro-inverter is connected to by looking at the phase of the voltage/current on the power line connecting the micro-inverter.

Some embodiments use identification messages received from micro-inverters for determining the phases of the voltage/current on the power lines. In some embodiments, the identification messages from the micro-inverters are timed with respect to a particular point in a cycle of the AC power on the power line. The gateway in some of these embodiments determines the phase of the power line connecting a particular micro-inverter based solely on when the message is received from the particular micro-inverter. Alternatively or conjunctively, the phase may be calculated based on the amplitude measurement the micro-inverter at the moment the message is sent. In some embodiments, the power line of each micro-inverter is identified in other ways, such as through manual input at the gateway. Identifying the power line/phase to which a micro-inverter injects power will be further described below in Section I.

The process 700 receives (at 710) a power output measurement from each of the individual micro-inverters. The power output measurement being reported a particular micro-inverter in some embodiments includes voltage, current, and power being produced by the particular micro-inverter.

The process 700 then analyzes (at 715) the received measures and computes an aggregate power being produced by the micro-inverters to each of the three power lines in the three-phase system. In some embodiments, the aggregate power injected into a particular power line is the sum of the power produced by individual micro-inverters connected to that particular power line.

Next, the process 700 determines (at 720) whether any adjustment is necessary. Adjustment is necessary when the imbalance between the different power lines of the multi-phase system is beyond a threshold value. Some embodiments set the threshold value based a state-regulated value, the expected output of a single micro-inverter, a custom user-identified value, and/or other variables. In some embodiments, a user of the gateway can modify the threshold amount of imbalance dynamically in order to trigger an adjustment. If no adjustment is necessary (i.e., the imbalance is within threshold), the process 700 returns to 710. Otherwise, the process proceeds to 725.

At 725, the process 700 sends adjustment control signals to the micro-inverters to control the output of the micro-inverters. These adjustment control signals, as described earlier by reference to FIG. 6, are transmitted from the gateway to the micro-inverters via a wireless communication system in some embodiments. Some embodiments sends adjustment control signals that shut down individual micro-inverters associated with a particular phase when the power output level to the power line of that phase is too high (i.e., much higher than power output to other phases). Some embodiments send adjustment control signals that reduce the output levels of individual micro-inverters in order to reduce the aggregate output of all of the micro-inverters injecting power into a particular phase. Conversely, the adjustment control signals may turn on individual micro-inverters (e.g., for micro-inverters that were previously turned off) or increase output levels of individual micro-inverters in order to increase the aggregate output of all of the micro-inverters injecting power into a particular phase.

After sending the adjustment control signals, the process 700 returns to 710 to continue monitoring the output levels from the micro-inverters.

In some embodiments, the process 700 may be used to balance other properties of the power being produced by micro-inverters in the different phases. For example, some embodiments use a process similar to the process 700 to balance voltage levels between the three different phases of the three-phase system. In some of these embodiments, rather than calculating an aggregate amount of power, the process computes the average peak voltage of the micro-inverters for each of the three phases. In some embodiments, process sends adjust and control signals to the micro-inverters such that the voltages of the power being injected into the three different power lines are balanced. In some of these embodiments, the voltage level of the power lines are being sensed at a point where the power being produced by the micro-inverters is being injected into the three phase system.

Several more detailed embodiments of the invention are described below. Section I describes the identification of the power line for each micro-inverter in a system. Section II describes the monitoring of the aggregate outputs for each power line of a multi-phase system. Section III describes the control of the power output of individual micro-inverters.

I. Identifying the Power Line for Each Micro-Inverter

In order to balance the power being injected to a three-phase power system from sets of micro-inverters, some embodiments first identify which phase or power line of the three-phase system each micro-inverter is connected to. In some embodiments of the invention, the power line/phase connected to a micro-inverter is identified by the gateway. By identifying the power line associated with each micro-inverter, the gateway is able to calculate the total amount of power being injected to each power line/phase of the three-phase power system.

In some embodiments, the power line connecting a micro-inverter can be identified based on an identification message sent by the micro-inverter. The identification message is used for identifying the properties of the voltage on the power line (e.g., amplitude, phase, etc.). In some embodiments, the micro-inverter sends an identification message only at a specified point in the cycle of the AC power on the power line. The specified point in the cycle may be any point in the cycle, such as at a peak, a zero crossing (positive to negative or negative to positive), 10% of peak level, etc. Each micro-inverter, regardless of which power line it is connecting, sends the message at the same point in the cycle of the voltage in the power line. Since the voltage/current on different power lines of a three-phase system are always at different phases of the AC power cycle (120° apart), a micro-inverters connecting a particular power line will reach the specified point in the cycle at a different time than another micro-inverter connecting a different power line. The gateway can therefore determine which power line a micro-inverter is connected to by analyzing the time when the message from the micro-inverter is received.

In some embodiments, the identification message provides information about the power on a power line, such as an instant voltage amplitude measurement of the voltage on the power line when the message is sent, which is used to calculate the phase of the voltage on the power line. By calculating the phase of the voltage on the power line, the gateway can identify the power line to which the micro-inverter is connected.

Figure 8:
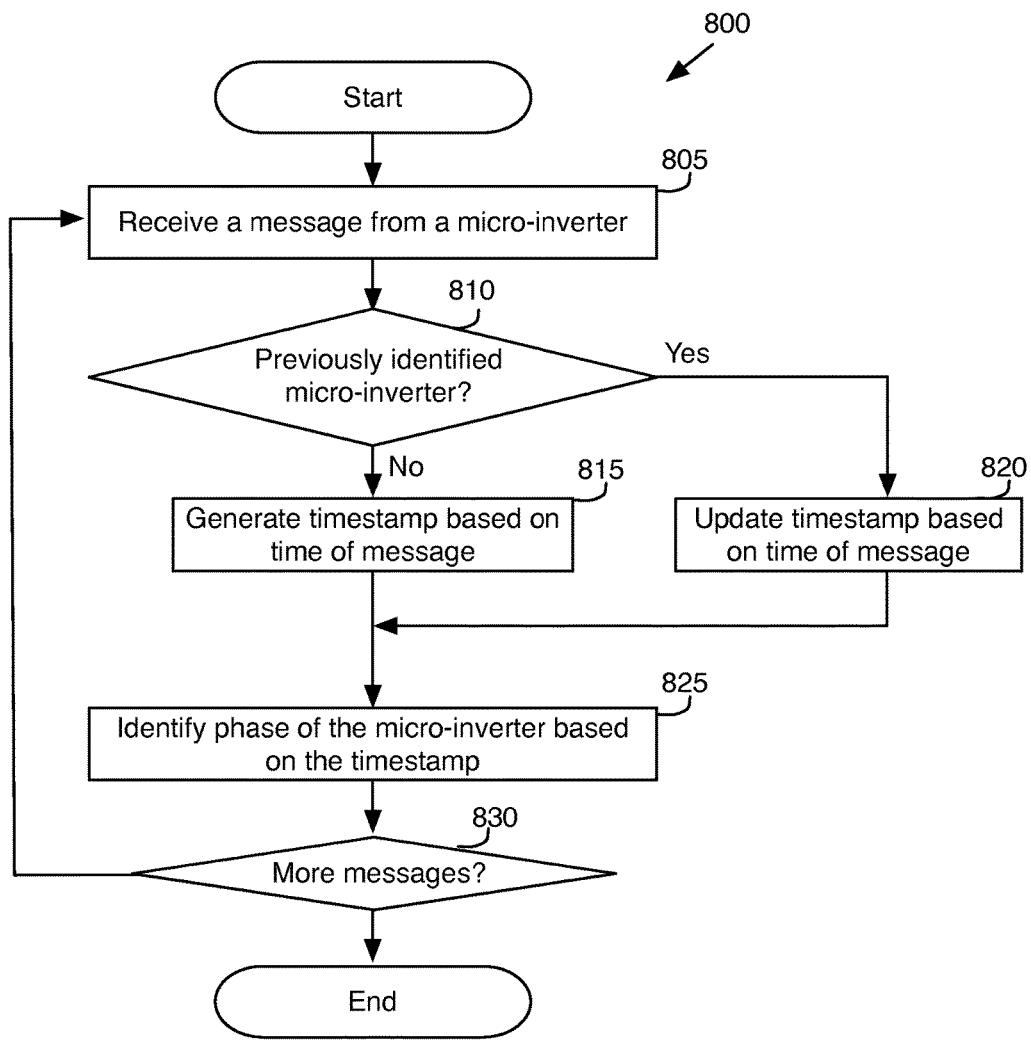
FIG. 8 conceptually illustrates the process performed by a gateway to identify the power line to which each micro-inverter is connected, in some embodiments.

For some embodiments, FIG. 8 conceptually illustrates a process 800 for identifying the power line of each micro-inverter. The process 800 is performed by the gateway in some embodiments, which identifies the connections between the micro-inverters and the power lines of the three-phase system. The gateway identifies the power line connected to each micro-inverter in order to calculate the aggregate power output to each power line. In some embodiments, the process 800 corresponds to operation 705 of the process 700.

The process 800 receives (at 805) an identification message from one of the micro-inverters in the system. In some embodiments, the identification message has a unique identifier which identifies the micro-inverter to the gateway. In some embodiments, an identification message contains additional information, such as the power output of the micro-inverter or the location of the micro-inverter within an installation. In some embodiments, a micro-inverter sends its identification message as it is being added to the system (such as during installation of the micro-inverters or when the micro-inverters are initially powered up). In some embodiments, a micro-inverter sends its identification message to the gateway when requested by the gateway. In some embodiments, micro-inverters send messages periodically (e.g., daily). In some embodiments, micro-inverters send messages upon the occurrence of certain events such as when the gateway is reset, when the gateway comes online, or when the gateway sends a request for identification messages from the micro-inverters.

In some embodiments, a micro-inverter sends timed identification messages that are sent at a specified point in time of the AC power cycle on the power line. In some embodiments, the micro-inverter may send messages that are not timed, but include other information about the power which the gateway can use to calculate the phase of the power on the power line. The gateway of some of these embodiments determines the phase of the power based on the other information in combination with the timestamp of when the messages are received. Using messages from micro-inverters to identify the connections between the micro-inverters and the power lines of the three-phase system will be described below in Sub-Section I-A.

After receiving an identification message from a particular micro-inverter, the process 800 determines (at 810) whether the particular micro-inverter has been identified before. If the micro-inverter has not been identified before, the process proceeds to 815. If the process 800 determines that this message is from a micro-inverter which has been identified before, the process updates (at 820) the timestamp associated with the micro-inverter based on the received message and proceeds to 825.

At 815, the process generates (at 815) a timestamp for the newly identified micro-inverter based on when the message is received. Generating the timestamp may include creating a new record for the micro-inverter which records the unique identifier of the micro-inverter, the timestamp of the first received message from the micro-inverter, as well as other information (e.g., voltage amplitude, location, etc.).

Once the timestamp for the micro-inverter has been updated or created, the process 800 identifies (at 825) the phase of the micro-inverter based on the timestamp. The gateway will analyze the timestamp of the message to identify the phase (i.e., the power line) to which the micro-inverter is connected. Using the timestamp of a micro-inverter to determine the phase (or the power line) associated with the micro-inverter will be further described below by reference to FIGS. 9a-c.

Once the phase of the micro-inverter has been identified, the process 800 determines (at 830) whether it has received any additional messages from any other micro-inverter in the system. If so, the process returns to 805 to receive and process the message. Otherwise, the process 800 ends.

A. Generating Timestamps from Identification Messages

In some embodiments, the gateway uses a timed identification message of a micro-inverter to determine the phase, and therefore the power line, of the micro-inverter. In some embodiments, this determination is based on when the message is received within a cycle of the AC power. This determination is possible because, in some embodiments, the micro-inverters send identification messages at a specified point during the AC power cycle (i.e., timed with a particular phase of the AC power cycle). In some embodiments, the specified point in the AC power cycle is when the voltage in the power line reaches peak amplitude. In some embodiments, the specified point in the AC power cycle is when the voltage in the power line crosses zero.

Figure 9A:
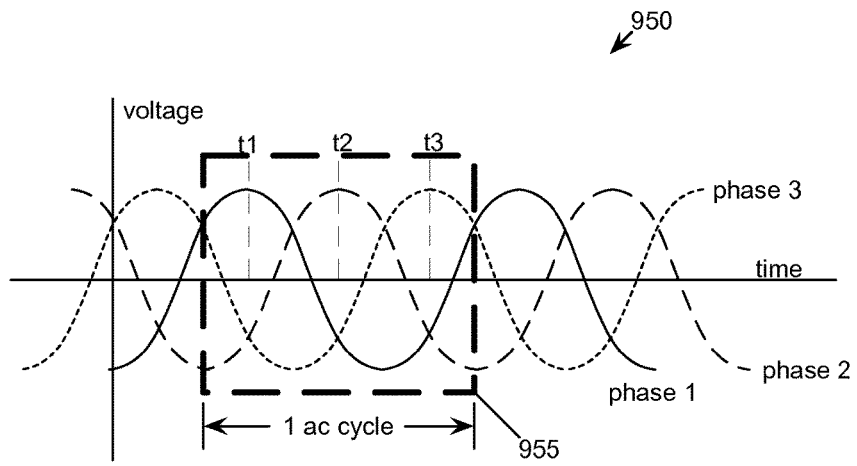
FIGS. 9a-c illustrate the timing of messages that are sent from micro-inverters to the gateway at specific points of the AC power cycle.
Figure 9A:
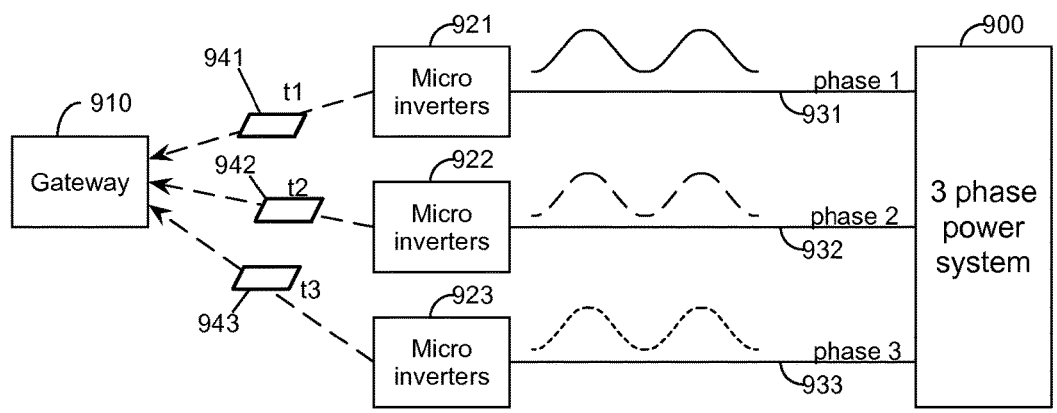
Figure 9B:
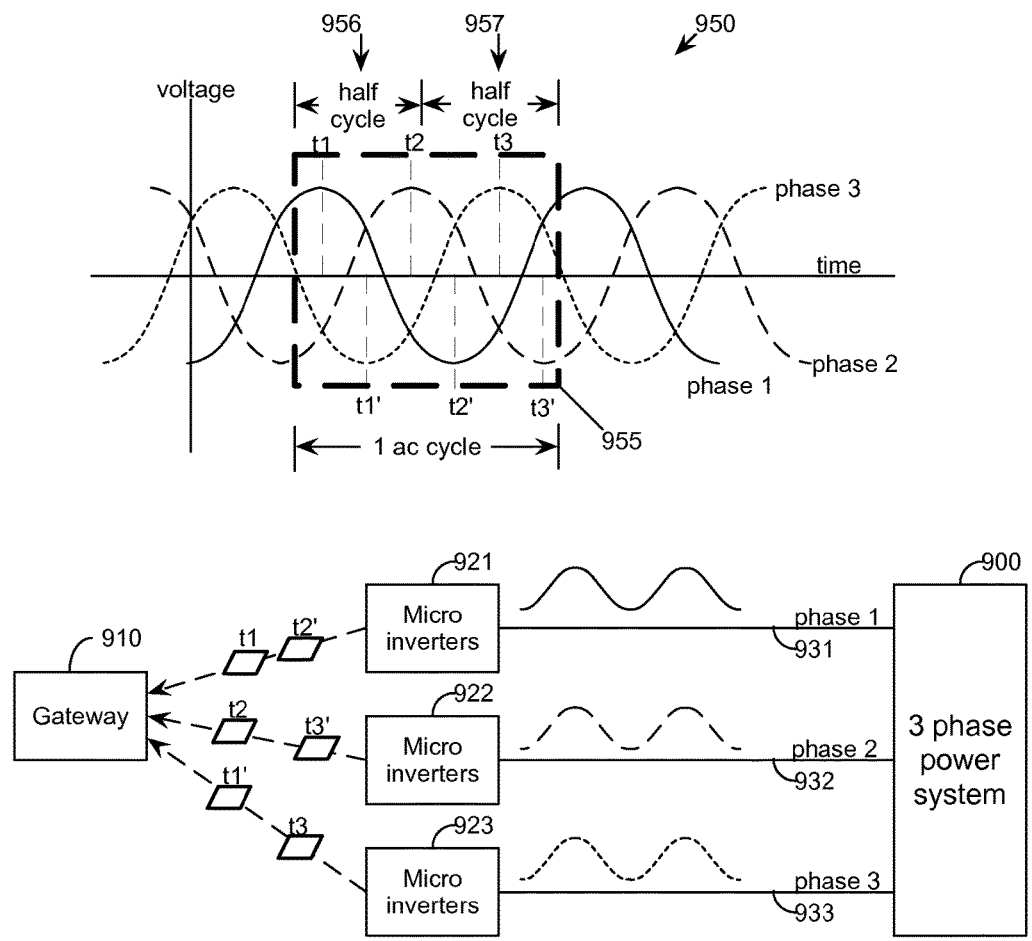
Figure 9C:
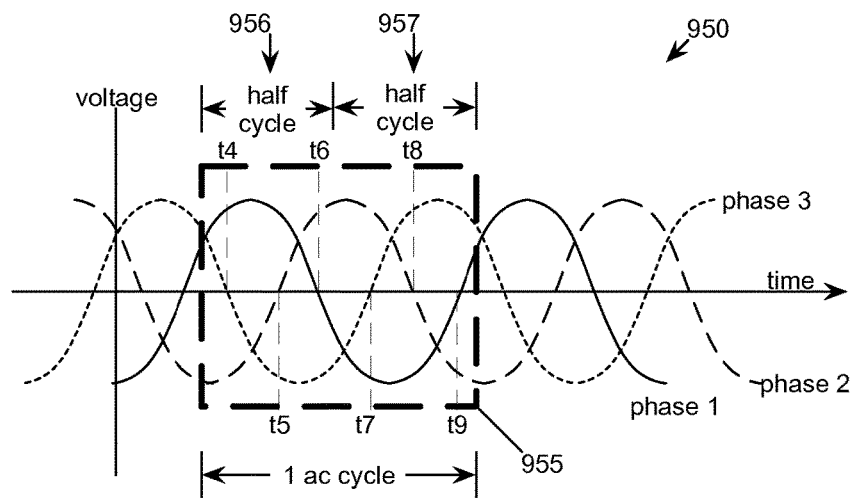
Figure 9C:
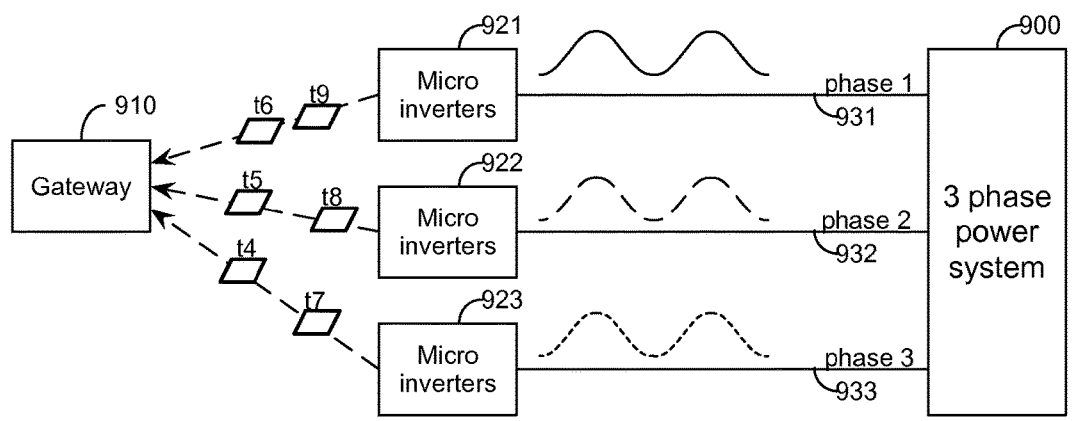

FIGS. 9a-c illustrate the timing of messages that are sent from micro-inverters to the gateway at specific points of the AC power cycle. FIGS. 9a-c shows a three-phase power system 900 (e.g., a grid) that receives power from micro-inverter sets 921-923. The three-phase power system has three power lines 931-933 at three different phases 1-3. The micro-inverter set 921 injects power into phase 1 power line 931, the micro-inverter set 922 injects power into phase 2 power line 932, and the micro-inverter set 923 injects power into phase 3 power line 933. Each of FIGS. 9a-c also includes a voltage level graph 950 showing the superposition of the AC voltage levels of phase 1-3 power lines. The solid dash box 955 in the graph 950 corresponds to one cycle of the AC power in the three-phase power system 900, during which the voltages in each of the three power lines 931-933 completes one sinusoidal AC cycle.

FIG. 9a illustrates micro-inverters that generate messages 941 at positive peaks of voltage amplitudes. Specifically, during the AC cycle 955, a micro-inverter in the set 921 generates a message 941 when the voltage in the phase 1 power line 931 reaches a positive peak at the time t1, a micro-inverter in the set 922 generates a message 942 when the voltage in the phase 2 power line 932 reaches a positive peak at the time t2, and a micro-inverter in the set 921 generates a message 943 when the voltage in the phase 3 power line 933 reaches a positive peak at the time t3.

Since the phase of each power line is shifted from the phases of the other power lines by 120 degrees, the three peaks of the three phases are evenly spaced within each AC power cycle. In the United States, AC power is cycled at 60 Hz or 60 cycles per second. Each cycle at 60 Hz is approximately 16.7 ms long. The evenly spaced positive peaks at t1, t2 and t3 would therefore be measured approximately 5.6 ms (or one third of the full cycle 16.7 ms) from each other. Upon receiving the messages 941-943 from the micro-inverters 921-923, the gateway 910 will therefore be able to determine that the micro-inverter 921, which sends the identification message 941 at the time t1, is attached to a power line that has a different phase than the micro-inverter 922, which sends the identification message 942 at the time t2, and that the micro-inverter 923, which sends the identification message 943 at the time t3, is attached to a power line that has a different phase than the micro-inverters 921 and 922.

One of ordinary skill would recognize that the micro-inverters not only send messages during the positive voltage peaks within the AC cycle 955, but also in AC cycles before and after the AC cycle 955. Furthermore, the gateway 910 may or may not receive all of the identification messages transmitted. However, given the periodicity of the AC power cycle, the gateway is still able to separate the micro-inverters into the three different phases based on the timing of the identification messages, because messages from micro-inverters attached to a power line of a particular phase always transmit identification messages at the same relative timing position of any AC cycle.

Micro-inverters in different embodiments send messages at different points (i.e., phase) of the AC cycle. FIG. 9b illustrates identification messages that are sent at both positive and negative peaks during the AC power cycle. Like in FIG. 9a, messages are sent when voltages in power lines 931-933 reach positive peaks at t1, t2, and t3, respectively. In addition, a micro-inverter in the set 921 generates a message when the voltage in the phase 1 power line 931 reaches a negative peak at time t2', a micro-inverter in the set 922 generates a message when the voltage in the phase 2 power line 932 reaches a negative peak at time t3', and a micro-inverter in the set 923 generates a message when the voltage in the phase 3 power line 933 reaches a negative peak at time t1'.

Since the micro-inverters transmit identification messages on both positive and negative peaks, messages from micro-inverters of a particular phase/power line reach the gateway on two different time slots of each AC cycle. For example, during the AC cycle 955, messages from micro-inverters in the set 922 are generated for the gateway at both time slot t2 and time slot t3'. Furthermore, in each half cycle, the gateway may receive messages from micro-inverters of all three power lines/phases messages from micro-inverters attached to a power line of a particular phase are always transmitted at the same relative timing position of any half cycle (e.g., in the half cycle 956, the messages from phases 1-3 are generated/transmitted at times t1, t2, and t1', respectively; in the half cycle 957, the messages from the phases 1-3 are generated/transmitted at times t2', t3', and t3). Given the periodicity of the AC power cycle, the gateway is able to separate the micro-inverters into the three different phases based on the timing of the identification messages within any half cycle.

In some embodiments, micro-inverters transmit identification messages at times in an AC cycle other than at the voltage amplitude peaks. For example, micro-inverters in some embodiments transmit identification messages at zero crossings. FIG. 9c illustrates identification messages that are sent at zero crossings during the AC power cycle. Specifically, during the AC cycle 955, a micro-inverter in the set 921 generates messages when the voltage in the phase 1 power line 931 crosses zero at the times t6 and t9, a micro-inverter in the set 922 generate messages when the voltage in the phase 2 power line 932 crosses zero at the times t5 and t8, and a micro-inverter in the set 923 generate messages when the voltage in the phase 3 power line 933 crosses zero at the times t4 and t7.

Like a micro-inverter that transmits a message once at the positive peak and once at the negative peak of an AC cycle, a micro-inverter that transmits at zero crossings also transmits messages twice every AC cycle (once at the positive to negative zero crossing and once at the negative to positive zero crossing). the gateway is able to separate the micro-inverters into the three different phases based on the timing of the identification messages within any half cycle (e.g., in the half cycle 956, the messages from phases 1-3 are generated/transmitted at time t6, t5, t4, respectively; in the half cycle 957, the messages from the phases 1-3 are generated/transmitted at times t9, t8, and t7, respectively).

When the micro-inverters send identification messages to the gateway that are timed with the phase of the power line to which the micro-inverter is connected, the gateway can use the delay of the received timestamp relative to the beginning of a reference AC power cycle of the grid to determine the phase of the corresponding power line. In some embodiments, as long as all of the micro-inverters send identification messages at the same specified point of a cycle (e.g., the peaks, the zero crossings, etc.,) the gateway will be able to determine the phase of the micro-inverter. Determining the power line based on the timed identification messages is described below with reference to FIG. 10.

In some embodiments, rather than the micro-inverter sending a timed message, the micro-inverter will send identification messages that are not sent at a particular point in the cycle of the voltage sensed on the power line of the micro-inverter. Instead, the micro-inverter message includes the instantaneous amplitude of the voltage at the moment in time when the message was generated. Because the frequency and the amplitude of the voltage on the power lines from the grid are well-regulated, the phase of a particular micro-inverter can be calculated based on the voltage amplitude at different points during a particular cycle of the voltage on the power line. Calculating the phase based on measurements of voltage amplitudes will be further described below with reference to FIG. 11.

B. Gateway (GW) Phase Identification

Figure 10:
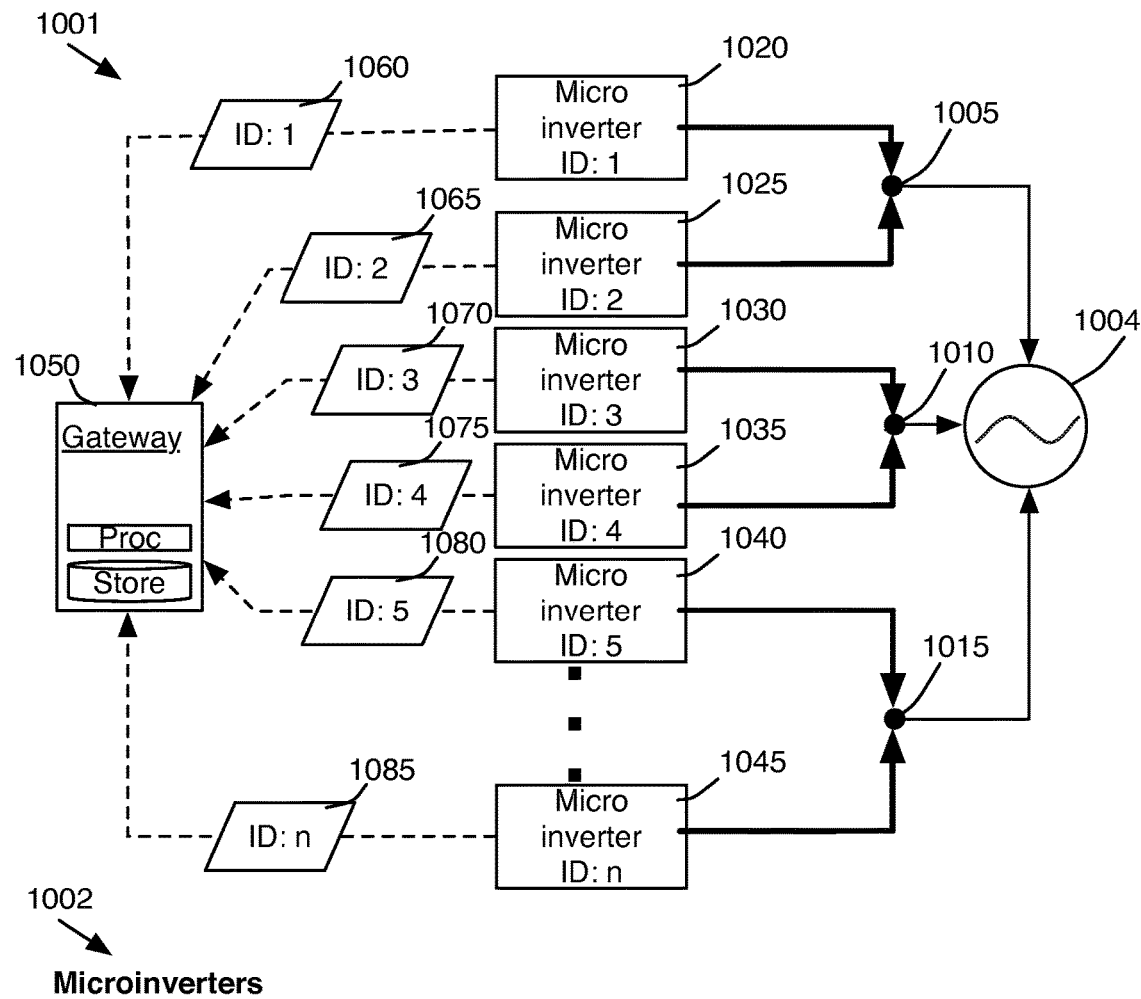
FIG. 10 illustrates an example of the phase identification process of some embodiments.

In some embodiments, the power line/phase identification process is performed by the gateway, which allows the gateway to automatically determine the phase of the power line for each micro-inverter with which the gateway communicates. For some embodiments, FIG. 10 illustrates an example of the power line/phase identification process of some embodiments. FIG. 10 shows a three-phase power output system 1001 and a data table 1002. The system 1001 includes a gateway 1050, micro-inverters 1020-1045, power lines 1005, 1010, and 1015 and power grid 1004. The data table 1002 is a table in a database stored in a storage of the gateway 1050 for some embodiments.

The micro-inverters 1020-1045 send identification messages 1060-1085 to gateway 1050. The micro-inverters 1020-1045 also provide power to the grid 1004. Micro-inverters 1020 and 1025 provide power to the grid 1004 across a first power line 1005 of the first phase in the three-phase system. Micro-inverters 1030 and 1035 provide power to the grid 1004 across a second power line 1010 for the second phase. Micro-inverters 1040 and 1045 provide power to the grid 1004 across a third power line 1015 for the third phase.

Each micro-inverter is physically connected to a power line of a particular phase and produces power aligned with that particular phase. The micro-inverters 1020-1045 also send identification messages 1060-1085 to the gateway 1050. In some embodiments, a micro-inverter sends an identification message when the micro-inverter powers up. In some embodiments, micro-inverters send messages on regular intervals, such as once daily. In some embodiments, the sent identification messages contain additional information related to the micro-inverter, such as the power output and/or the physical location of the micro-inverter sending the message. In this example, the identification messages are timed with the phase of the power on the particular power line to which each micro-inverter is connected, as described above with reference to FIGS. 9a-c.

In this example, the micro-inverters 1020 and 1025 send messages timed with the phase of the power on the power line 1005, the micro-inverters 1030 and 1035 send messages timed with the phase of the power on the power line 1010, and the micro-inverters 1040 and 1045 send messages timed with the phase of the power on the power line 1015. The gateway 1050 receives the identification messages 1060-1085 and maintains a timestamp for each micro-inverter. The timestamp is a record of the time at which a message is received. This time may be measured against a standard 12-hour clock or may be measured against an internal clock of the gateway 1050. As seen in the data table 1002, the gateway 1050 records a timestamp for each micro-inverter based on the received time of the message.

The gateway 1050 analyzes the timestamp of each micro-inverter to determine an offset for each timestamp relative to the beginning of the AC power cycle of the grid. Since the length of a cycle and the occurrence of the peaks (or zero crossings) for each power line within that cycle do not change, regardless of what time is selected as the beginning of the AC power cycle, the offset of any messages aligned with a particular phase will be constant relative to the beginning of the particular AC power cycle during which the message is received. In some embodiments, the gateway sets the beginning of the first AC power cycle upon receiving the first identification message. In some of these embodiments, the gateway sets the beginning of the first AC power cycle by making the beginning of the first AC power cycle to coincide with the timestamp of the first received identification message. In the example of FIG. 10, the gateway sets the beginning of the first AC power cycle to the start of the first received identification message 1060 (4:35:36:300000).

Once the gateway 1050 has set the beginning of the first AC power cycle, the gateway 1050 can calculate the beginning of a current AC power cycle (can be the first AC power cycle or a subsequent AC power cycle) that encompasses the timestamp of a currently received identification message. The beginning of the current cycle is the beginning of the cycle containing the timestamp (i.e., the cycle which begins immediately before the timestamp). Because a cycle takes a fixed period of time to complete, the beginning of the current cycle will occur at some multiple of the length of a single cycle (e.g., 16.7 ms for 60 Hz AC power cycle) after the beginning of the first AC power cycle. For example, if the length of a single cycle was 10 ms, the beginning of a current cycle could occur at any multiple of 10 ms (e.g., 20 ms, 30 ms, 100 ms, etc.) after the beginning of the first AC power cycle. The offset, then, is the difference between the timestamp and the beginning of the current cycle. In some embodiments, the offset may be calculated as follows:

Offset=Timestamp mod cycle_length

In this example, timestamp is the amount of time that has passed since the beginning of the first cycle. Cycle_length is the length of a single cycle in milliseconds. By performing a modulus operation on the timestamp with the cycle-length, the offset gives the length of time between the receipt of the currently identification message and the beginning of the current cycle.

Once the offset has been calculated, the phase can be identified because all messages which are aligned with a particular phase should generate similar offsets. In this example, the offset for the first identification message 1060 is 0 because the gateway set the beginning of the cycle at the first identification message's timestamp. Identification message 1065 receives a timestamp of 4:35:36:301667. The difference from the beginning of the first cycle is 16.7 ms, 1 cycle after the first identification message 1060. 16.7 mod 16.7 gives an offset of 0, which matches the offset of message 1060 because messages 1065 and 1060 are aligned with the phase of the same power line 1005.

Identification message 1070 has a timestamp 5.6 ms after the first identification message 1060, so the offset from the current cycle is 5.6 ms, which is one third of a single cycle. In a three-phase system running at 60 Hz and using full cycles, 5.6 ms is the expected offset for a level which is shifted from a reference signal by 120 degrees. Identification message 1075 has a timestamp 3166.7 ms (or 190 cycles) after the timestamp of message 1070, so identification message 1075 also has an offset of 5.6 ms. This matches the offset of message 1070 which is aligned with the phase of the same power line 1010. As seen in this example, the gateway 1050 may receive identification messages from micro-inverters connected to any power line at any time and in any order.

Similarly for identification messages 1080 and 1085 from micro-inverters 1040 and 1045 connected to phase 1015, both messages are calculated to have an offset of 11.1 ms, therefore identifying them as being connected to phase 1015. As described above, some embodiments may use half-cycles and positive and negative peaks, but the results will be the same.

There may be small differences in the offsets due to differences between the expected and actual receive times. These differences may arise for various reasons, such as transmission times over the communication system. In such cases, in some embodiments, the phase for a received message may be identified as the phase which is nearest to the offset of the received message. In other embodiments, a response may be sent back to the micro-inverter requesting that the identification message be resent.

Once the offset has been calculated, the gateway can identify that micro-inverters with a particular offset are connected with a particular power line. Once the corresponding line for each micro-inverter has been identified, the gateway can monitor the aggregate power outputs of the micro-inverters to the lines as described below in Section II.

Some embodiments use identification messages that report instantaneous voltage amplitudes of the power on the power line for identifying the phase, and therefore the power line, of a micro-inverter. Assuming the AC power on the power line has well-regulated peak amplitude and frequency, a gateway receiving two or more identification messages from a particular micro-inverter will be able to determine which of the three phases/power lines of the three-phase power system the particular micro-inverter is connected with. With two or more identification messages at different points in the AC power cycle, along with the well-regulated peak amplitude and frequency, the gateway can calculate the phase of the power on the power line of the micro-inverter because there is only one phase that will fit the set of information.

Figure 11:
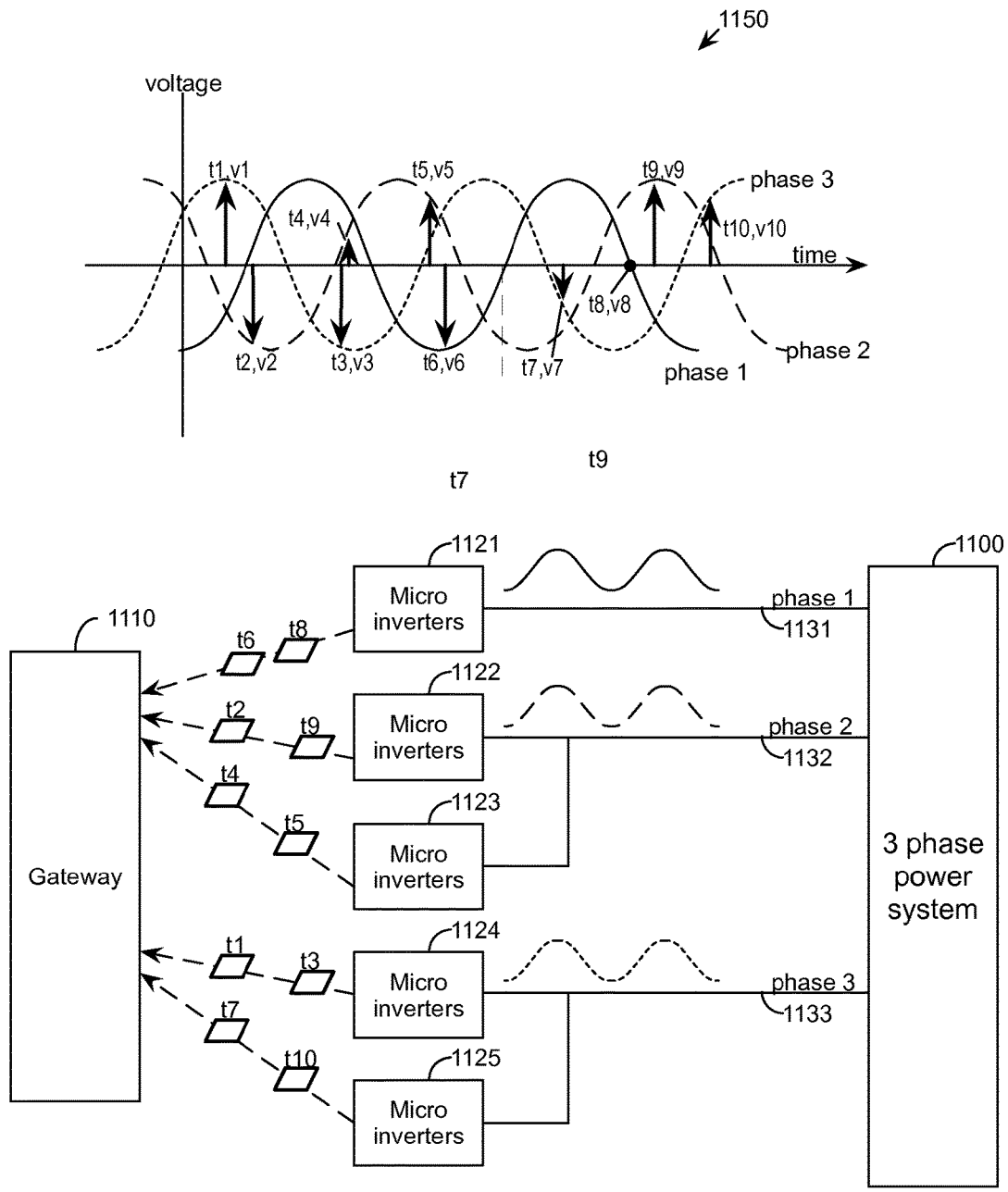
FIG. 11 illustrates a three-phase power system in which micro-inverters report instantaneous voltage amplitudes to a gateway.

FIG. 11 illustrates a three-phase power system 1100 in which micro-inverters 1121-1125 report instantaneous voltage amplitudes to a gateway 1110. The three-phase power system 1100 (e.g., a grid) receives power from the micro-inverters 1121-1125. The three-phase power system has three power lines 1131-1133 at three different phases 1-3. The micro-inverter 1121 injects power into phase 1 power line 1131, the micro-inverters 1122 and 1123 inject power into phase 2 power line 1132, and the micro-inverters 1124 and 1125 inject power into phase 3 power line 1133. The figure also includes a voltage level graph 1150 showing the superposition of the AC voltage levels of phase 1-3 power lines. Specifically, the phase 1 power line 1131 is at voltage v6 at time t6 and at voltage v8 at time t8; the phase 2 power line 1132 is at voltage v2 at time t2, at voltage v4 at time t4, at voltage v5 at time t5, and at voltage v9 at time t9; and the phase 3 power line 1133 is at voltage v1 at time t1, at voltage v3 at time t3, at voltage v7 at time t7, and at voltage v10 at time t10.

The micro-inverters 1121-1125 send identification messages to the gateway 1110. Specifically, the micro-inverter 1121 sends identification messages at time t6 and t8 to report voltage amplitudes v6 and v6; the micro-inverter 1122 sends identification messages at time t2 and t9 to report voltage amplitudes v2 and v9; the micro-inverter 1123 sends identification messages at time t4 and t5 to report voltage amplitudes v4 and v5; the micro-inverter 1124 sends identification messages at time t1 and t3 to report voltage amplitudes v1 and v3; and the micro-inverter 1125 sends identification message at time t7 and t10 to report voltage amplitudes v7 and v10.

As mentioned above, the gateway uses two identification messages from a particular micro-inverter to determine the phase/power line that the particular micro-inverter belongs to. Hence, for example, the gateway is able to determine that the micro-inverter 1122 belongs to phase 2 based on the messages received at times t2 (reporting instantaneous voltage v2) and at time t9 (reporting instantaneous voltage v9). Likewise, the gateway is able to determine that the micro-inverter 1125 belongs to phase 3 based on the messages received at times t7 (reporting instantaneous voltage v7) and at time t10 (reporting instantaneous voltage v10). With two identification messages at different points in the AC power cycle, the gateway can calculate the phase of the power on the power line of the micro-inverter because there is only one phase that will fit the set of information.

Although two alternative methods for determining the phase of a power line based on an identification message received from a micro-inverter are described, one skilled in the art will realize that many other methods exist to identify the phase of the power line to which a micro-inverter is connected, based on an identification message, where the identification message is based on the phase of the power line to which the micro-inverter is connected. By determining the phase, and therefore the power line, for each micro-inverter, the gateway can monitor the outputs of the micro-inverters by calculating an aggregate output of all of the micro-inverters to each power line.

II. Monitoring Micro-Inverter Outputs

Figure 12:
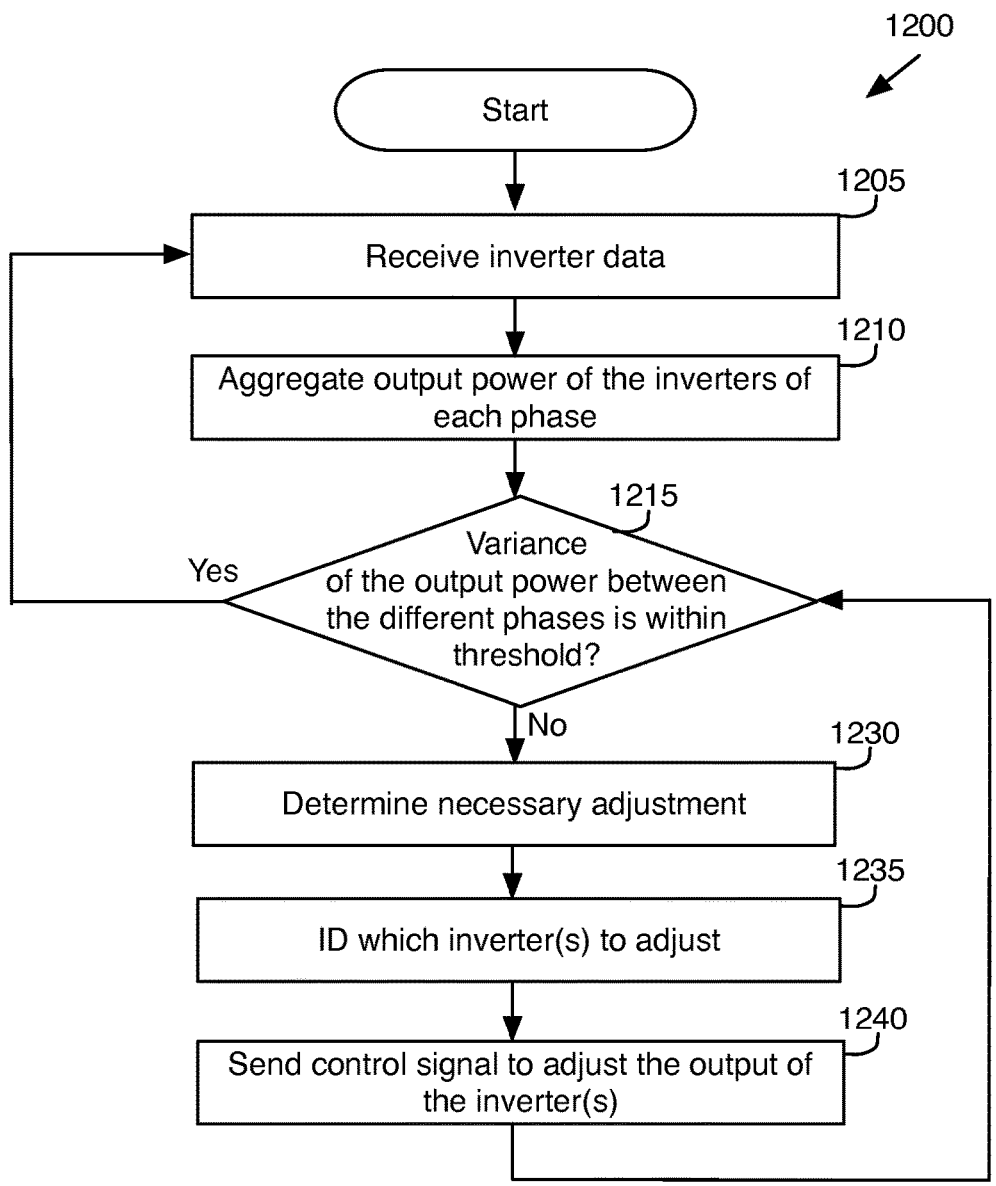
FIG. 12 conceptually illustrates the process for analyzing the micro-inverter outputs and adjusting the outputs to balance the power output to each power line of a three-phase system.

FIG. 12 conceptually illustrates a process 1200 for analyzing the micro-inverter outputs and adjusting the outputs to balance the power output to each power line of a multi-phase system. The process 1200 is performed by a gateway in some embodiments to monitor a set of micro-inverters injecting power into a three-phase power system. The process 1200 analyzes and controls the outputs of individual micro-inverters to balance the aggregate output (or voltage level) to each power line of a multi-phase system. The process 1200 receives (at 1205) data from each of the micro-inverters. Based on the received information, the process determines which phase/power line each micro-inverter injects power into according to the phase identification described above in Section I.

Next, the process 1200 aggregates (at 1210) the power output of the micro-inverters of each power line. Once the output power of the micro-inverters of each phase has been aggregated, the process 1200 determines (at 1215) whether the maximum difference between the different power lines (in terms of the total power outputs to each power line) is within a threshold value. In some embodiments, the maximum difference or imbalance of the output power is the difference in the output power between the highest-producing power line and the lowest-producing power line. Some amount of imbalance between the different power lines is to be expected, but the threshold value determines when that imbalance is beyond an acceptable level. The threshold value may be different in some embodiments (e.g., a state-regulated value, the expected output of a single micro-inverter, a custom user-identified value, etc.). If the imbalance is within the threshold value, the process 1200 returns to 1205 to continue monitoring by receiving more micro-inverter data. If the imbalance is beyond the threshold value, the process proceeds to 1230.

At 1230, the process determines the necessary amount of adjustment. In some embodiments, the process powers on or shuts down individual micro-inverters to control the output to a particular power line. In some of these embodiments, the granularity at which the output is controlled is in increments of a single micro-inverter's output. Alternatively or conjunctively, all of the micro-inverters continue production, but the gateway adjusts the output of individual micro-inverters by raising or lowering an output threshold (i.e., a limit on the amount of power to be output by a particular micro-inverter).

The process 1200 then identifies (at 1235) the micro-inverter(s) which need to be adjusted or shutdown. When the process 1200 identifies the micro-inverters to be adjusted, the process may select micro-inverters in such way as to maximize the expected life of the entire set of micro-inverters by distributing the usage of the different micro-inverters evenly so that the expected life of each micro-inverter is similar to the others. The process 1200 may identify micro-inverters which have been running for the longest amount of time to be shut down. This may mean that new micro-inverters are rarely shut down. In other cases, it may be based on recent usage so that micro-inverters which have gone the longest without being shut down are shut down first. The process 1200 may also select a micro-inverter based on other properties of the micro-inverter, such as location within the array or recent power output performance.

Once the process determines the necessary adjustment to send and identifies the micro-inverters to be controlled, the process 1200 sends (at 1240) the control signal to the identified micro-inverters to reduce the output by the determined adjustment amount. In some embodiments, the control signal commands the identified micro-inverter to either turn on or off. In some embodiments, the control signal changes the power output threshold of the micro-inverter so the micro-inverter increase or decrease power output by a specified amount.

As described above, these messages may be sent wirelessly or through wired connections with the micro-inverters. After sending the control signal, the process returns to 1215.

Figure 13:
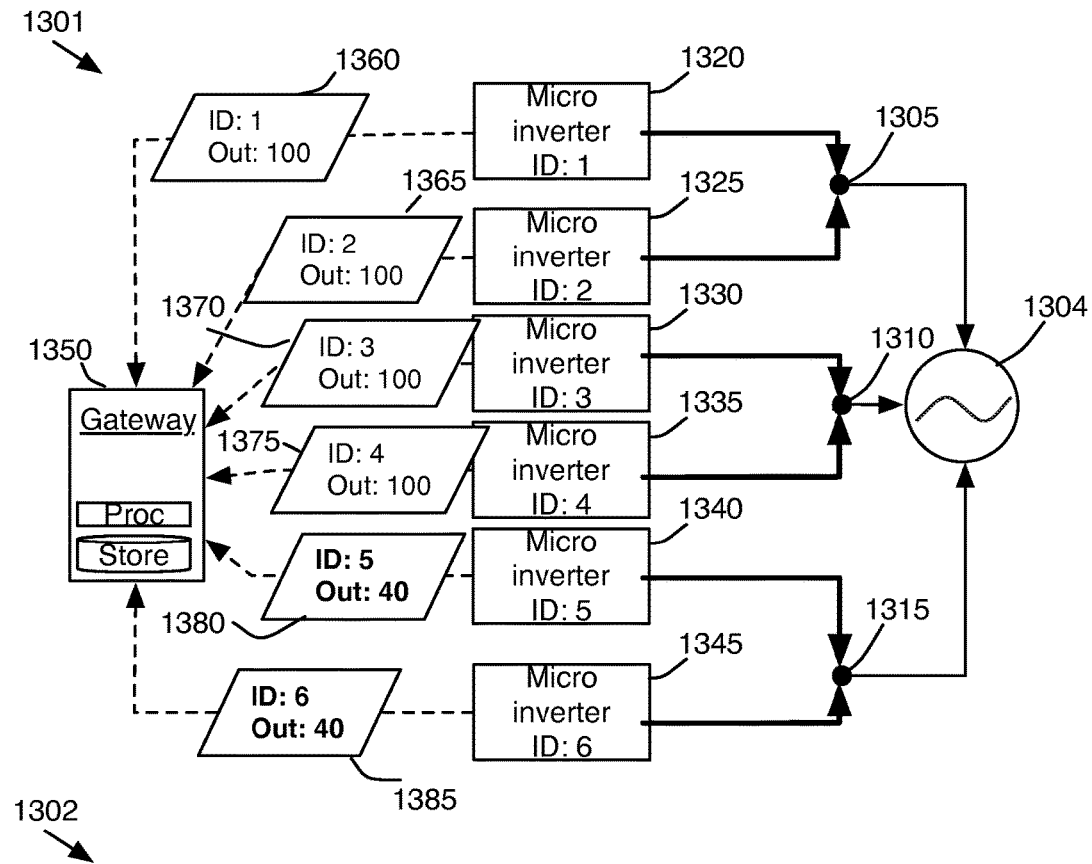
FIG. 13 illustrates an example of the analysis performed by the gateway to determine the aggregate output to each power line of a three-phase power system.

FIG. 13 illustrates an example of the analysis performed by the gateway to monitor the aggregate output to each power line of a three-phase power system. FIG. 13 shows a three-phase power output system 1301 and a data table 1302. The three-phase system 1301 includes a gateway 1350, micro-inverters 1320-1345, power lines 1305, 1310, and 1315, and grid 1304. The gateway 1350 communicates with the micro-inverters 1320-1345, which provide power to the grid 1304 along the power lines 1305, 1310, and 1315. The micro-inverters 1320-1345 also send power output messages 1360-1385 to the gateway 1350. Based on the received power output messages 1360-1385, the gateway 1350 maintains and updates the data table 1302 in a storage.

The power output messages 1360-1385 are sent by the micro-inverters 1320-1345 to the gateway 1350. The power output messages 1360-1385 provide a measurement of the power output of the micro-inverters. In some embodiments, this measurement is the average power output of the micro-inverter over a specified period of time (e.g., 4 minutes). Each micro-inverter in the system 1301 may send the power output messages at various times (e.g., at regular intervals, after a change in the power output, at the request of the gateway, etc.). In this example, the power output messages 1360-1375 show that the micro-inverters 1320-1335 are each producing 100 Watts. However, due to shading or some other circumstance, the micro-inverters 1340-1345 are only producing 40 Watts each.

When the gateway 1350 receives power output messages 1360-1385 from the micro-inverters 1320-1345, the gateway aggregates the power output of the micro-inverters of each power line according to the phase identification described with reference to FIG. 8. The gateway calculates the total output for all of the micro-inverters for a particular power line and monitors the total output to each power line. The results of the calculations are shown in the data table 1302. The data table 1302 keeps track of the power output of individual micro-inverters as well as the aggregate power output to each of the power lines/phases of the three-phase power system. In this example, the micro-inverters 1320 and 1325 connected to the phase 1 power line 1305 have a total output of 200 Watts. Micro-inverters 1330 and 1335 connected to the phase 2 power line 1310 also have a total output of 200 Watts. However, micro-inverters 1340 and 1345 connected to the phase 3 power line 1315 only have a total output of 80 Watts. The output to power line 1315 is 120 Watts less than the output to power lines 1305 and 1310.

In some embodiments, the micro-inverters do not send power output messages. The gateway in some of these embodiments determines the aggregate output power to each power line in other ways. For example, in some embodiments, sensors on each power line of the multi-phase system may detect the aggregate output of the micro-inverters on the power line.

After determining the aggregate output, some embodiments control the output to each power line. For the example system 1301, in order to bring the three-phase system back to being symmetrical, the micro-inverter 1350 upon analyzing the table 1302 send control messages to adjust the output of individual micro-inverters (e.g., by turning off some micro-inverters for phase 1 and phase 2, by turning on some micro-inverters for phase 3, or by decrease power output of some micro-inverters for phase 1 and phase 2, etc.).

Alternatively or conjunctively, some embodiments seek to balance other aspects of the power output to each line. For example, rather than the actual power output to each power line, the gateway 1350 is used to balance the voltage levels of the three phases. In some embodiments, the power output messages 1360-1385 may describe the voltage detected on each power line. The voltage on each power line may vary when the loads or internal resistances of each power line are different. Rather than balancing the aggregate power output to each power line, the gateway 1350 may instead control the output of each micro-inverter to balance the voltage levels on each power line. For the sake of simplicity, the process will be described with reference to power outputs, but it should be clear to one skilled in the art that other embodiments may be used to control other aspects of the power on the power line, such as the voltage.

Figure 14:
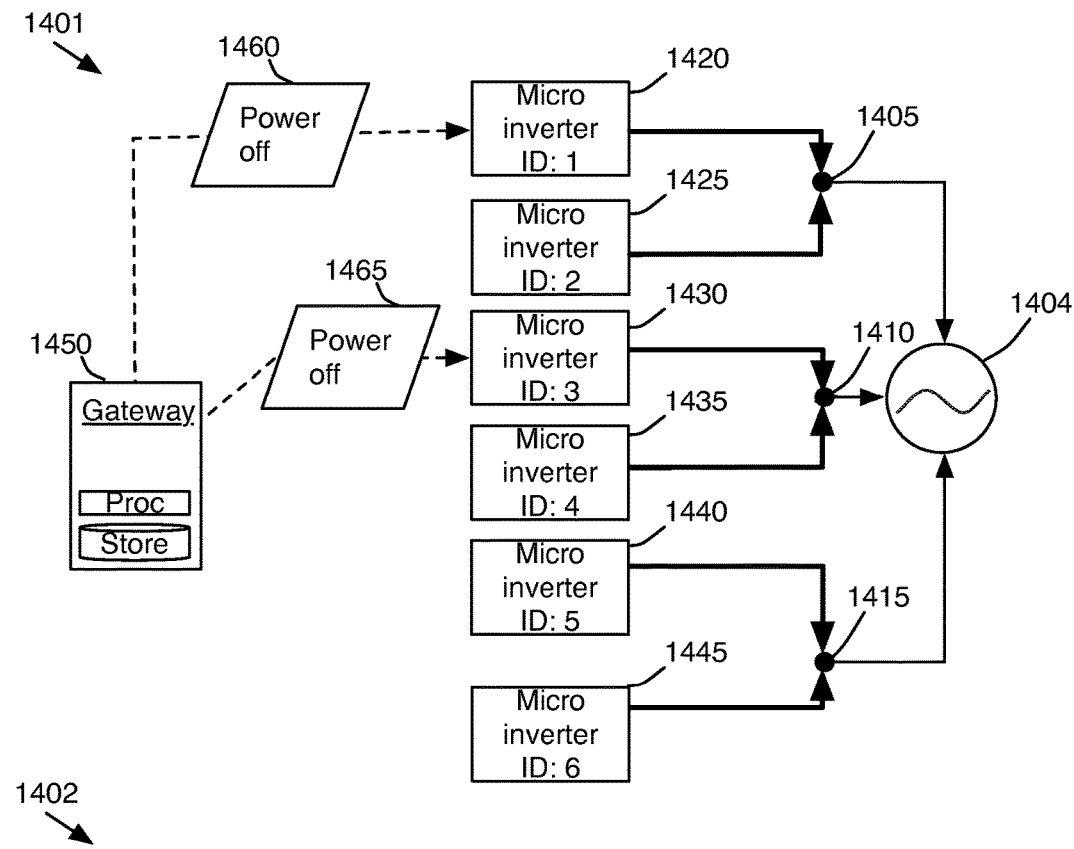
FIG. 14 illustrates a method for controlling the aggregate output to different power lines by shutting down individual micro-inverters.
Figure 15:
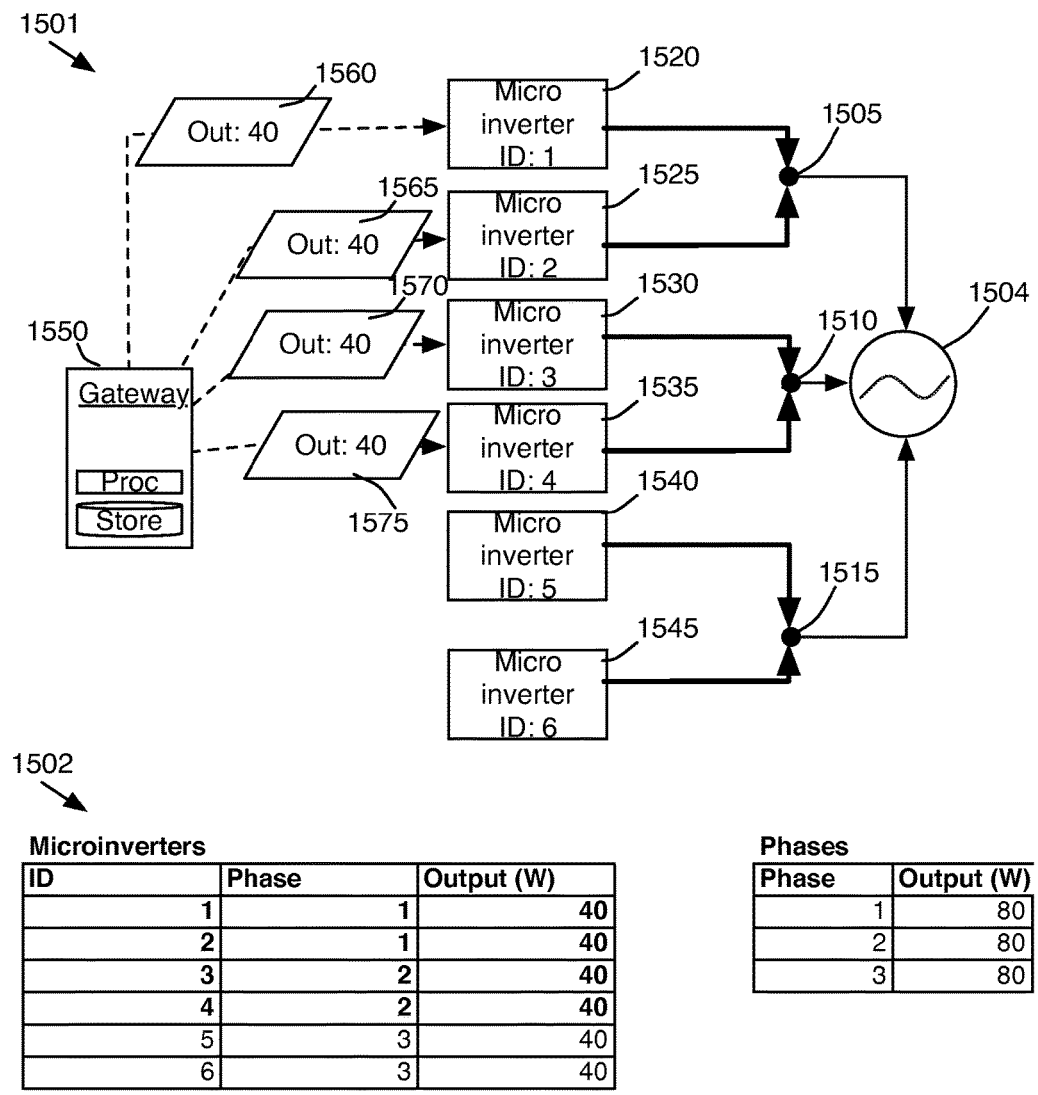
FIG. 15 illustrates a method for controlling the aggregate output to different power lines by managing a threshold output level for a set of micro-inverters.

FIGS. 14 and 15 illustrate different methods for controlling the aggregated output to each power line of a three-phase system for some embodiments. FIG. 14 illustrates a method for controlling the aggregate output to each power line by shutting down individual micro-inverters. Shutting down the individual micro-inverters may allow for simpler circuit designs or for longer life expectancies for the individual micro-inverters. In addition, micro-inverters run more efficiently when running at full power, so it may be beneficial to shut down some micro-inverters and allow the remaining micro-inverters to perform at maximum efficiency. FIG. 14 illustrates a three-phase power system 1401 that is similar to the three-phase power system 1301 of FIG. 13. The system 1401 includes a gateway 1450, micro-inverters 1420-1445, power lines 1405, 1410, and 1415 and a grid 1404. The gateway 1450 communicates with the micro-inverters 1420-1445 with control messages 1460 and 1465. The micro-inverters 1420 and 1425 supplies power to the phase 1 power line 1405, the micro-inverters 1430 and 1435 supplies power to the phase 2 power line 1410, and the micro-inverters 1440 and 1445 supplies power to the phase 3 power line 1415.

The gateway 1450 sends control messages 1460 and 1465 to individual micro-inverters which have been selected to be temporarily shut down. In the example illustrated, the gateway 1450 is transmitting control messages 1460 and 1465 to the micro-inverters 1420 and 1430, respectively. The gateway 1450 may select micro-inverters in such way as to maximize the expected life of the entire set of micro-inverters by distributing the usage of the different micro-inverters evenly so that the expected life of each micro-inverter is similar to the others. Alternatively or conjunctively, the gateway 1450 may identify micro-inverters which have been running for the longest amount of time to be shut down. This may mean that new micro-inverters are rarely shut down. In other cases, it may be based on recent usage so that micro-inverters which have gone the longest without being shut down are shut down first. The gateway 1450 may also select a micro-inverter based on other properties of the micro-inverter, such as its location within the array or recent power output performance. The control messages 1460 and 1465 then shut down the micro-inverters 1420 and 1430.

FIG. 14 also illustrates an updated data table 1402 (updated from the data table 1302 of FIG. 13), which includes a micro-inverter data table and a phases data table. The data table 1402 shows the result of the gateway's calculation of the aggregate outputs to each power line after the control messages 1460 and 1465 have been sent to shut-down micro-inverters 1420 and 1430. The power outputs to phase 1 and phase 2 are now reduced to 100 Watts each (from 200 Watts) and the power output to phase 3 remains at 80 Watts, leaving an imbalance of 20 Watts. Although the outputs to the different power lines are still not perfectly balanced, the imbalance between the power lines has been reduced to no more than the expected output of a single micro-inverter (i.e., 100 Watts).

FIG. 15 illustrates a method for controlling the aggregate output to each power line by managing a threshold output level for a set of micro-inverters for some embodiments. Managing the threshold output level by setting a limit on the maximum output for a micro-inverter may allow the gateway to be more precise in managing the output of a set of micro-inverters. FIG. 15 illustrates a three-phase power system 1501 that is similar to the power system 1401 of FIG. 14. The three-phase power output system 1501 includes a gateway 1550, micro-inverters 1520-1545, power lines 1505, 1510, and 1515, and grid 1504. The gateway 1550 communicates with the micro-inverters 1520-1545 with threshold control messages 1560-1575. The micro-inverters 1520 and 1525 supply power to the phase 1 power line 1505, the micro-inverters 1550 and 1535 supply power to the phase 2 power line 1510, and the micro-inverters 1540 and 1545 supply power to the phase 3 power line 1515.

The gateway 1550 sends control messages to micro-inverters. However, rather than the shutdown control messages of FIG. 14, the gateway 1550 in FIG. 15 sends threshold control messages 1560-1575. Threshold control messages 1560-1575 set threshold output levels for micro-inverters that receive the messages. As illustrated, the threshold control message 1560 sets the threshold output level of micro-inverter 1520 to 40 W, the threshold control message 1565 sets the threshold output level of micro-inverter 1525 to 40 W, the threshold control message 1570 sets the threshold output level of micro-inverter 1530 to 40 W, and the threshold control message 1575 sets the threshold output level of micro-inverter 1535 to 40 W. The threshold output level, in some embodiments, causes the micro-inverter to cap its output at a particular level. The micro-inverters scales back the amount of power that is converted and output.

FIG. 15 also illustrates an updated data table 1502 (updated from the data table 1302 of FIG. 13), which includes a micro-inverter data table and a phases data table. The data table 1502 shows the result of the gateway's calculation of the aggregate outputs to each power line after the threshold control messages 1560-1575 have been sent to adjust the power output of micro-inverters 1520-1535. The power outputs to phase 1 and phase 2 are now reduced to 80 Watts each (from 200 Watts) and the power output to phase 3 remains at 80 Watts. The three phases of the power system 1501 are therefore balanced/symmetrical.

In some embodiments, all of the micro-inverters of a particular phase are sent the same threshold control message, reducing the output of each micro-inverter by a similar amount. Alternatively or conjunctively, the gateway 1550 may select micro-inverters to be scaled back based on criteria similar to the shutdown control messages of FIG. 14. For instance, the output thresholds of a subset of the set of micro-inverters connected to a particular power line may be selected to be scaled back because they are older or have been running at full power for a longer period of time. The method for scaling back a micro-inverter's output is described further below with reference to FIG. 17.

III. Controlling Individual Micro-Inverter Outputs

Figure 16:
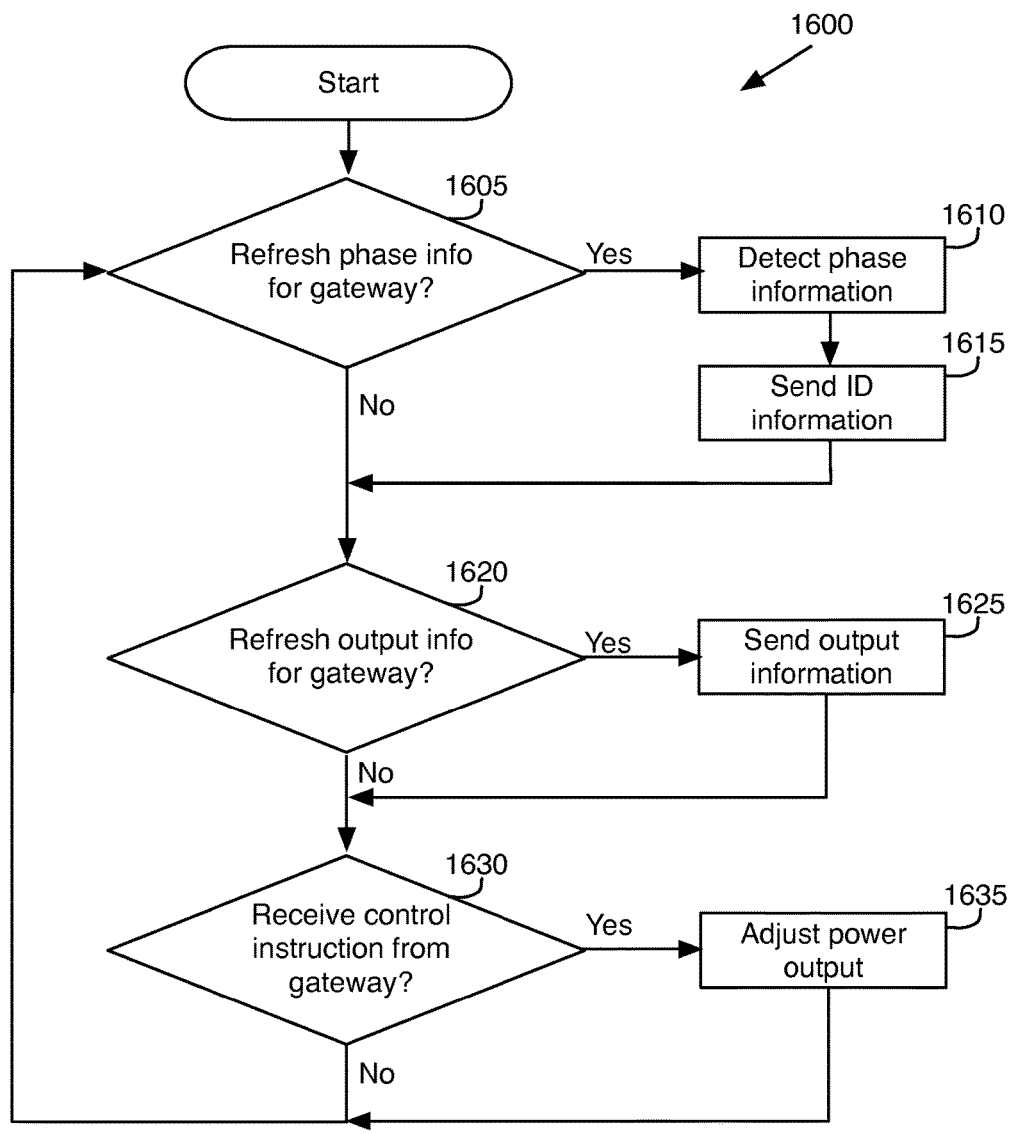
FIG. 16 conceptually illustrates the process performed by each micro-inverter in a system to identify itself and communicate with the gateway.

FIG. 16 conceptually illustrates a process 1600 performed by each micro-inverter in a system to identify itself and to communicate with a gateway. The process 1600 is performed continuously by each of the micro-inverters as they interact with the gateway in a system similar to the system 600 of FIG. 6 in some embodiments.

The process 1600 determines (at 1605) whether it is necessary to refresh the phase information at the gateway used for phase identification as described in process 800 of FIG. 8. In some embodiments, such phase information is maintained in a data table that is similar to the data table 1002 of FIG. 10. Such a data table keeps track of the individual micro-inverters, ensuring that the phase for each micro-inverter is properly identified. In some embodiments, the information at the gateway may need to be refreshed after a particular period of time (e.g., once daily). In other embodiments, the phase identification may only be performed at the initial installation of a micro-inverter or upon receiving a request from the gateway.

If the phase information does not need to be updated, the process proceeds directly to 1620. If the process 1600 needs to update the phase information, the process detects (at 1610) the phase of the voltage sensed on the power line of the micro-inverter as described with reference to FIGS. 9*a-c*. The process 1600 then sends (at 1615) a message based on the detected phase (e.g., a timed message sent at a particular point in the detected phase, a message with the instant sensed voltage amplitude at a particular point in the phase, etc.) to the gateway which then updates the timestamp and phase information as described at 820 of FIG. 8 before continuing to 1620.

At 1620, the process 1600 determines whether it is necessary to refresh the output information for the gateway. The output information is a description of the amount of power being generated by the particular micro-inverter. In some embodiments, such output information is maintained in a data table that is similar to the data table 1302 of FIG. 13 (and the updated data tables 1402 and 1502). Such a data table keeps track of the power output of individual micro-inverters as well as the aggregate power output to each of the power lines/phases of the three-phase power system. The process 1600 in some embodiments determines that it is necessary to refresh the output information at regular intervals (e.g., once every four minutes) or when a request for updated information is received from the gateway. The output information may include the voltage, current, total power output, and other information about the power produced by the micro-inverter. If the process determines that the output information needs to be refreshed, it sends (at 1625) the output information to the gateway before proceeding to 1630. Otherwise, the process directly proceeds to 1630.

The process 1600 determines (at 1630) whether a control signal has been received from the gateway. If the process has not received a control signal from the gateway, it returns to 1605 to begin the process again. If the process 1600 has received a control signal from the gateway, it adjusts (at 1635) the power output of the micro-inverter accordingly. As described above, adjusting the power output of the micro-inverter may include shutting down a micro-inverter or adjusting the power output threshold of the micro-inverter. The process then returns to 1605 to begin the process 1600 again.

Figure 17:
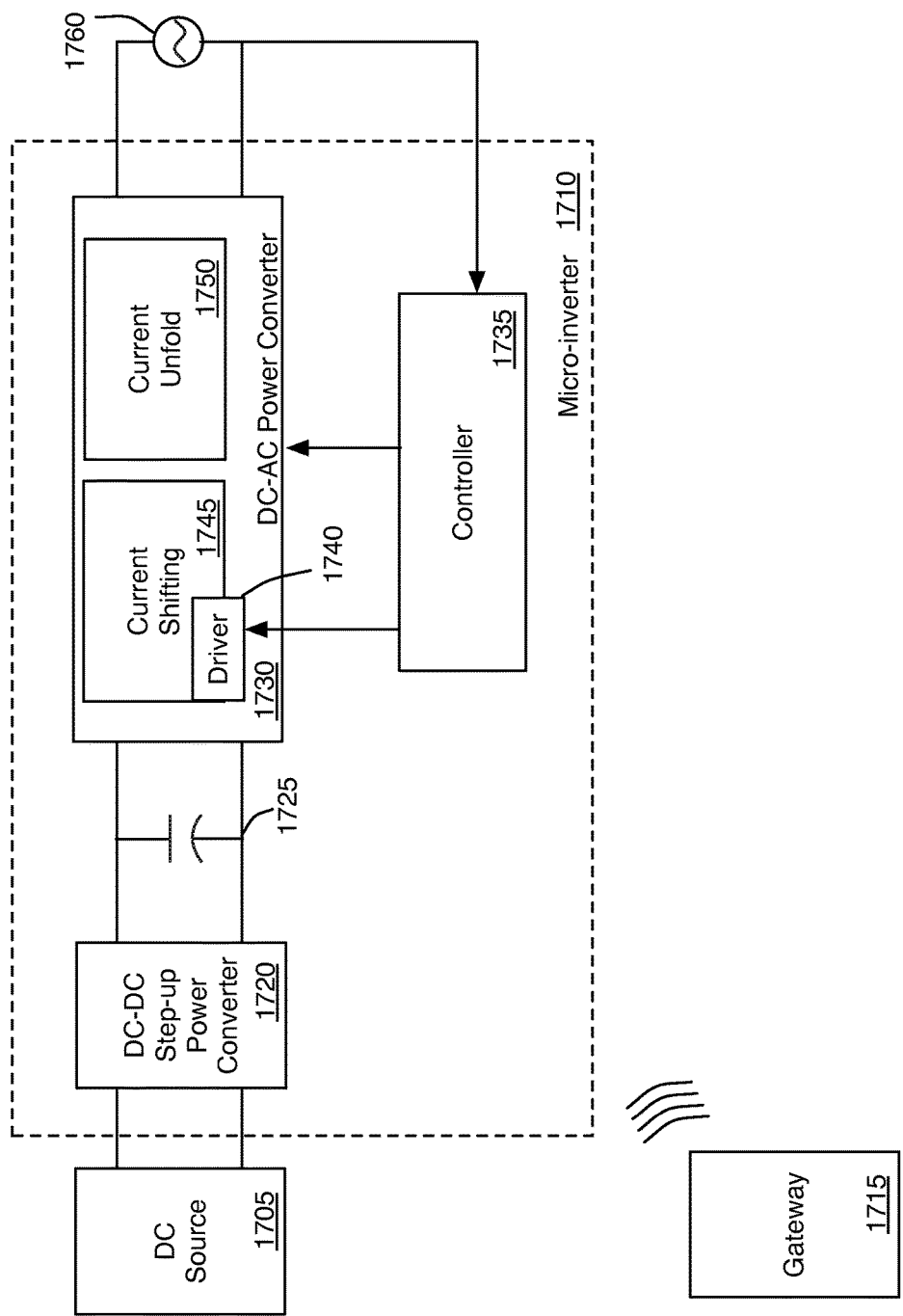
FIG. 17 illustrates a simplified circuit layout of a micro-inverter of some embodiments.

FIG. 17 illustrates a simplified circuit layout of a micro-inverter 1710 of some embodiments. The micro-inverter 1710 is one of several micro-inverters in communication with a gateway 1715 in order to control the output of the several micro-inverters individually to balance the aggregate outputs to each power line of a multi-phase system. The micro-inverter 1710 receives power from a DC source 1705 (e.g., solar panels) and converts the received DC power into AC power for an AC load 1760. In some embodiments, the AC load 1760 is in a three-phase power system and the micro-inverter 1710 injects the converted AC power into a power line of a particular phase of the three-phase power system. In some embodiments, the three-phase power system is part of a power grid.

As illustrated, the micro-inverter circuit 1710 includes a DC-DC step-up power converter 1720, a DC link 1725, a DC-AC power converter 1730, and a controller 1735. The DC-AC converter 1730 includes a driver circuit 1740, a current shifting stage 1745, and a current unfold stage 1750.

The controller 1735, in some embodiments, communicates with the gateway 1715, sending the power output and identification messages to the gateway 1715 and receiving control messages back from the gateway 1715. The controller 1735 in turn controls the output of the micro-inverter 1710 to the AC power load 1760 based on the received control messages. The controller also controls the DC-AC power converter 1730.

The micro-inverter circuit 1710 converts the DC power into AC power to be output for the AC load 1760. In some embodiments, the DC-DC step-up power converter 1720 uses a transformer (not shown) to step up the voltage of the input to match the voltage of the power grid 1760. The DC power is then fed into the DC link 1725, which in some embodiments includes a capacitor for storing the generated power.

The DC-AC power converter 1730 converts the stored energy in the DC link 1725 into AC power for the AC grid 1760. When the micro-inverter circuit 1710 receives threshold control messages from the gateway 1715, the controller 1735 signals the driver 1740 of the current shifting stage 1745 to step down and shift the current without changing the voltage, reducing the overall power output of the micro-inverter circuit 1710. In some embodiments, the current shifting stage 1745 uses a buck converter to step down the current by signaling the driver 1740 to reduce the current being output by the micro-inverter circuit 1710. The current shifting stage shifts the current into rectified AC waveforms. Finally, The current unfold stage 1750 takes the stepped down rectified AC power and unfolds it into AC power to be output to the AC load 1760. Examples of a multi-stage micro-inverter can be found in U.S. Patent Application Publication No. 2011/0205766.

Although a particular embodiment of a micro-inverter is described, one skilled in the art will realize that the methods and systems described may apply to many different types of micro-inverters or other power producing devices. Furthermore, although many of the examples described in this document are three-phase power systems, one of ordinary skill would realize that the methods and systems described in this document are applicable to multi-phase power systems that includes four or more phases.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
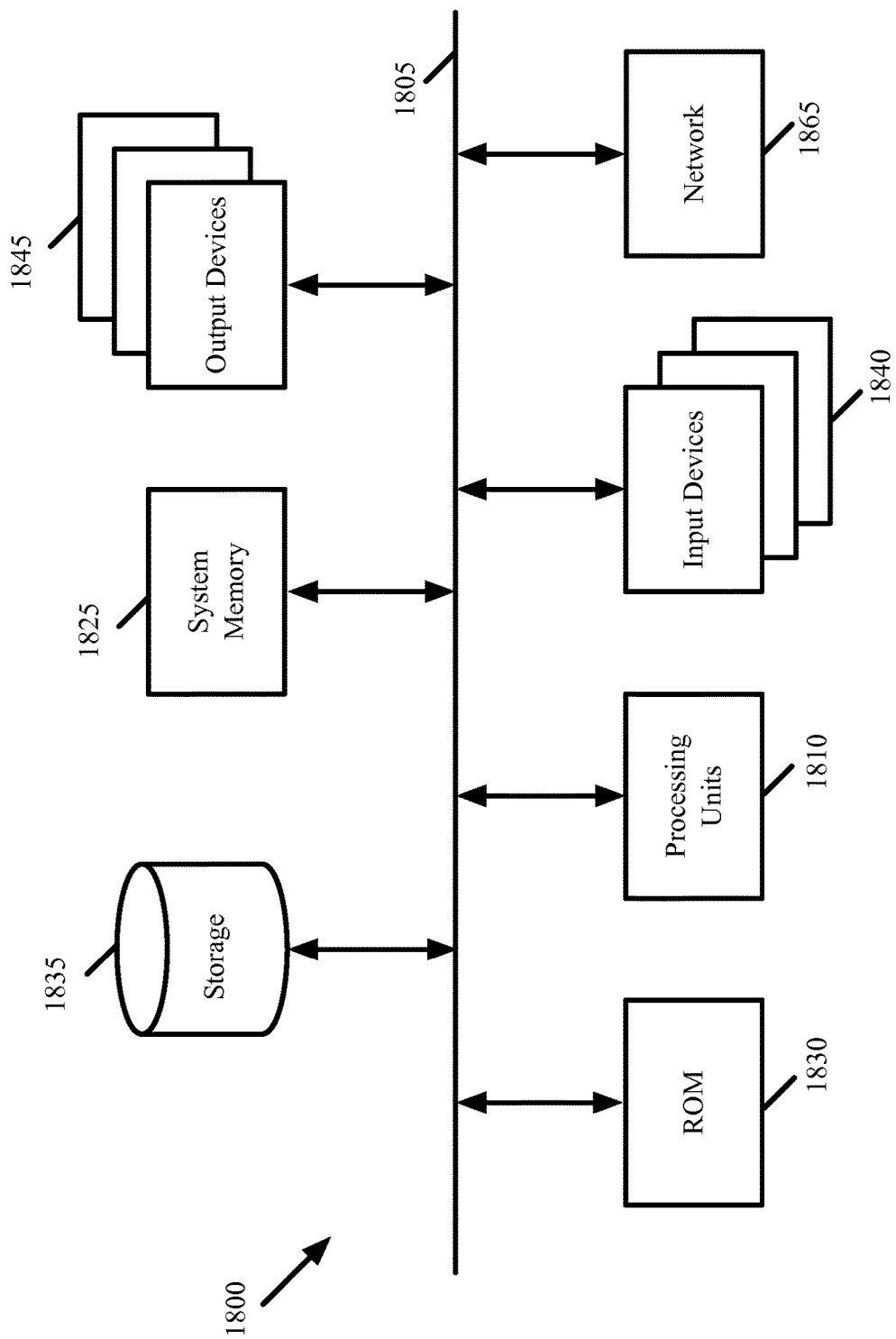
FIG. 18 illustrates an electronic system with which some embodiments of the invention are implemented.

FIG. 18 conceptually illustrates an electronic system 1800 with which some embodiments of the invention are implemented. The electronic system 1800 can be used to execute any of the control, virtualization, or operating system applications described above. The electronic system 1800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1800 includes a bus 1805, processing unit(s) 1810, a system memory 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1825, and the permanent storage device 1835.

From these various memory units, the processing unit(s) 1810 retrieve instructions to execute and data to process in order to execute the processes of the invention. The processing unit(s) may be a single processor or a multi-core processor in different embodiments.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, etc.) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830. From these various memory units, the processing unit(s) 1810 retrieve instructions to execute and data to process in order to execute the processes of some embodiments.

The bus 1805 also connects to the input and output devices 1840 and 1845. The input devices enable the user to communicate information and select commands to the electronic system. The input devices 1840 include alphanumeric keyboards and pointing devices (also called "cursor control devices"). The output devices 1845 display images generated by the electronic system. The output devices include printers and display devices, such as cathode ray tubes (CRT) or liquid crystal displays (LCD). Some embodiments include devices such as a touchscreen that function as both input and output devices.

As shown in FIG. 18, bus 1805 also couples electronic system 1800 to a network 1865 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For example, while the examples shown illustrate splitting one or more shapes of a design layout region into two exposures, one of ordinary skill in the art would recognize that some embodiments would use similar processes to split shapes of a design layout region into more than two (e.g., three, four, etc.) exposures. One of ordinary skill in the art will also recognize that in some instances above, when referring to assigning shapes or portions of shapes to multiple exposures, the shapes (or portions thereof) are actually assigned to multiple mask layouts that are used to create multiple masks that enable a design layout layer to be printed in multiple exposures. Similarly, one of ordinary skill would recognize that while many instances above refer to "drawing" a graph, some embodiments do not actually draw the visible graph, but instead define the graph as a data structure.

In addition, a number of the figures (including FIGS. 7, 8, 12, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details.

What is claimed is:

1. A multi-phase power system comprising:
a plurality of photovoltaic modules;
a plurality of micro-inverters organized into a plurality of sets of micro-inverters, each set of micro-inverters operable to convert DC power from at least one of the photovoltaic modules into AC power to be injected into one of three-phases of a three-phase AC power grid; and
a wireless gateway;
wherein each of the plurality of micro-inverters wirelessly transmits a signal to the wireless gateway indicative of that micro-inverter's current power output, and the wireless gateway calculates an aggregate power output of each set of micro-inverters based on the signal and balances an output voltage supplied by each of the plurality of sets of micro-inverters to each of the three phases of the AC power grid by sending a command to at least one micro-inverter to control an output voltage of that micro-inverter; and
wherein each of the plurality of micro-inverters transmits the signal at a predetermined point of an AC cycle of the power line that the micro-inverter is coupled to and the wireless gateway uses the signal and a timing of when the signal is transmitted to determine a phase of that power line.

2. The multi-phase power system of claim 1, wherein the signal includes an identification message comprising properties of a voltage on a power line of the three-phase AC power grid that the micro-inverter is coupled to.

3. The multi-phase power system of claim 1, wherein the wireless gateway is operable to balance the AC power to be injected into the AC power grid by of each of the plurality of sets of micro-inverters by controlling an output of each set of micro-inverters within a threshold value of an output of the other sets of micro-inverters.

4. The multi-phase power system of claim 1, wherein the wireless gateway sends control signals to each of the plurality of micro-inverters such that voltages of the AC power to be injected into each of the three-phases are balanced.

5. The multi-phase power system of claim 4, wherein the wireless gateway balances voltages of the AC power to be injected into each of the three-phases by computing an average peak voltage of each of the plurality of sets of micro-inverters.

6. The multi-phase power system of claim 4, wherein the control signals comprise instructions to prevent a micro-inverter from injecting power into the three-phase AC power grid.

7. The multi-phase power system of claim 1, wherein each of the plurality of micro-inverters comprises a wireless transmitter for transmitting information and a wireless receiver for receiving control signals.

8. A multi-phase power system comprising:
a first set of micro-inverters for injecting AC power into a first power line of a multi-phase AC grid mains;
a second set of micro-inverters for injecting AC power into a second power line of a multi-phase AC grid mains;
a third set of micro-inverters for injecting AC power into a third power line of a multi-phase AC grid mains; and
a wireless gateway for (i) receiving a set of information comprising an individual power output from each micro-inverter of the first, the second and the third sets of micro-inverters, (ii) calculating an aggregate power output of each of the first, the second and the third sets of micro-inverters, and (iii) balancing the injected power into the first, the second and the third power lines of the multi-phase AC grid mains by controlling a power output of at least one micro-inverter of the first, the second and the third sets of micro-inverters;
wherein each inverter of the first, second and third sets of micro-inverters transmits the set of information at a predetermined point of an AC cycle of the power line that each respective micro-inverter is coupled to and the wireless gateway uses the transmitted set of information and a time of the transmission to determine a phase of the power line for each respective micro-inverter.

9. The multi-phase power system of claim 8, wherein the identification message comprises properties of a voltage on the power line that micro-inverter is coupled to.

10. The multi-phase power system of claim 8, wherein the wireless gateway is operable to balance the AC power injected into the AC grid mains by each micro-inverter of the first, the second and the third sets of micro-inverters by controlling an output of each of the first, the second and the third sets of micro-inverters within a threshold value.

11. The multi-phase power system of claim 8, wherein the wireless gateway sends control signals to each micro-inverter of the first, the second and the third sets of micro-inverters such that voltages of the AC power injected into the first, the second and the third power lines are balanced.

12. The multi-phase power system of claim 8, wherein each micro-inverter of the first, the second and the third sets of micro-inverters comprises a wireless transmitter for transmitting information and a wireless receiver for receiving control signals.

13. A method for balancing injected power into a multi-phase AC grid mains, the method comprising:
controlling the injection of AC power into a first power line of the multi-phase AC grid mains with a first set of micro-inverters;
controlling the injection of AC power into a second power line of the multi-phase AC grid mains with a second set of micro-inverters;
controlling the injection of AC power into a third power line of the multi-phase AC grid mains with a third set of micro-inverters;
receiving, by a wireless gateway, a set of information comprising an individual power output from each micro-inverter of the first, the second and the third sets of micro-inverters;
identifying, by the wireless gateway, a power line that each micro-inverter of the first, second and third sets of micro-inverters is coupled to by receiving the set of information at a predetermined point of an AC cycle of the power line that each micro-inverter is coupled to;
calculating, by the wireless gateway, an aggregate power output of each of the first, the second and the third sets of micro-inverters; and
balancing the injected power into the first, the second and the third power lines by controlling a power output of at least one micro-inverter of the first, the second and the third sets of micro-inverters.

14. The method of claim 13, wherein controlling the power output of the at least one micro-inverter comprises setting a threshold output level for the at least one micro-inverter that is different from a threshold output level of a micro-inverter in a different set of micro-inverters coupled to a different power line.

* * * * *